(12) United States Patent
Liu

(10) Patent No.: US 12,436,434 B2
(45) Date of Patent: Oct. 7, 2025

(54) DISPLAY PANEL HAVING IMPROVED DISPLAYING UNIFORMITY AND DISPLAY DEVICE THEREOF

(71) Applicant: BOE Technology Group Co., Ltd., Beijing (CN)

(72) Inventor: Peng Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/029,275

(22) PCT Filed: Jun. 23, 2022

(86) PCT No.: PCT/CN2022/100669
§ 371 (c)(1),
(2) Date: Mar. 29, 2023

(87) PCT Pub. No.: WO2023/245536
PCT Pub. Date: Dec. 28, 2023

(65) Prior Publication Data
US 2025/0076717 A1   Mar. 6, 2025

(51) Int. Cl.
*G02F 1/1362* (2006.01)
(52) U.S. Cl.
CPC .............. *G02F 1/136286* (2013.01)
(58) Field of Classification Search
CPC ................................................ G02F 1/136286
See application file for complete search history.

(56) References Cited

U.S. PATENT DOCUMENTS

| 5,537,061 | A | 7/1996 | Honjo |
| 2012/0081410 | A1 | 4/2012 | Yeo et al. |
| 2016/0205643 | A1 | 7/2016 | Ko |
| 2018/0342194 | A1 | 11/2018 | Li et al. |
| 2023/0143823 | A1* | 5/2023 | Lee ................. H10D 86/441 257/91 |

FOREIGN PATENT DOCUMENTS

| CN | 106991990 A | 7/2017 |
| CN | 111463254 A | 7/2020 |
| JP | H07-30401 A | 1/1995 |

* cited by examiner

*Primary Examiner* — Joseph L Williams
(74) *Attorney, Agent, or Firm* — WHDA, LLP

(57) ABSTRACT

The application provides a display panel. The display panel includes a display area, and the display area includes: a plurality of kinds of signal lines, wherein a same kind of signal lines include reference lines and lines to be compensated, sizes of the lines to be compensated along extension directions of the lines to be compensated are smaller than sizes of the reference lines along extension directions of the reference lines; and compensation lines, including first compensation lines, wherein the first compensation lines are electrically connected with the lines to be compensated, for compensating differences between the sizes of the lines to be compensated along the extension directions of the lines to be compensated and the sizes of the reference lines along the extension directions of the reference lines, wherein a number of the compensation lines is less than or equal to a number of the signal lines.

20 Claims, 18 Drawing Sheets

DISPLAY PANEL HAVING IMPROVED DISPLAYING UNIFORMITY AND DISPLAY DEVICE THEREOF

CROSS-REFERENCE TO RELATED APPLICATION

The present disclosure is a National Stage of International Application No. PCT/CN2022/100669, filed on Jun. 23, 2022, with the title of "DISPLAY PANEL AND DISPLAY DEVICE", which is incorporated herein in its entirety by reference.

FIELD

The present application relates to the field of display technology, in particular to a display panel and a display device.

BACKGROUND

With development of science and technology, in order to make a display panel better adapt to an overall structure and use requirements of an environment, the requirements for appearance of a display panel are gradually increasing, and then specially-shaped display panels are produced.

SUMMARY

Embodiments of the application adopts the following technical solutions.

On the one hand, an embodiment of the present application provides a display panel, including a display area, wherein the display area includes:

a plurality of kinds of signal lines, wherein a same kind of signal lines include reference lines and lines to be compensated, sizes of the lines to be compensated along extension directions of the lines to be compensated are smaller than sizes of the reference lines along extension directions of the reference lines; and compensation lines, including first compensation lines, wherein the first compensation lines are electrically connected with the lines to be compensated, for compensating differences between the sizes of the lines to be compensated along the extension directions of the lines to be compensated and the sizes of the reference lines along the extension directions of the reference lines, wherein a number of the compensation lines is less than or equal to a number of the signal lines.

Optionally, the plurality of kinds of signal lines include gate-signal lines and data-signal lines, and the gate-signal lines intersect with and are insulated from the data-signal lines, in a condition that the number of the compensation lines is less than the number of the signal lines, the number of the compensation lines is equal to a number of the gate-signal lines, of the number of the compensation lines is equal to a number of the data-signal lines.

Optionally, the plurality of kinds of signal lines include gate-signal lines and data-signal lines, and the gate-signal lines intersect with and are insulated from the data-signal lines, and in a condition that the number of the compensation lines is equal to the number of the signal lines, a number of a part of the compensation lines is equal to a number of the gate-signal lines, and a number of another part of the compensation lines is equal to a number of the data-signal lines Optionally, the display panel further includes: a plurality of sub-pixels arranged in an array, wherein the gate-signal lines and data-signal lines define an area at which the plurality of sub-pixels are located, and the first compensation line, and the line to be compensated electrically connected with the first compensation line, are located between adjacent sub-pixels of the plurality of sub-pixels.

Optionally, the compensation lines further include second compensation lines, extension directions of the second compensation lines are the same as that of the first compensation lines, and the second compensation lines are insulated from all of the signal lines, and the second compensation lines are set between adjacent sub-pixels of the plurality of sub-pixels, between which no first compensation line is located.

Optionally, the second compensation line and the reference line are located between the adjacent sub-pixels.

Optionally, sizes of the first compensation lines along the extension directions of the first compensation lines are smaller than sizes of the second compensation lines along the extension directions of the second compensation lines.

Optionally, the compensation lines further include third compensation lines, the third compensation lines are set in a same layer as the first compensation lines and are disconnected from the first compensation lines, and the third compensation lines are collinear with the first compensation lines, and the third compensation lines are set at positions at which no first compensation line is set, between adjacent sub-pixels of the plurality of sub-pixels, between which the first compensation lines are set, and the third compensation lines are insulated from the lines to be compensated electrically connected with the first compensation lines, and electrically connected with other lines to be compensated.

Optionally, the first compensation line includes a plurality of separate sub-segments, and all of the sub-segments are electrically connected with the line to be compensated.

Optionally, the third compensation lines are spaced by adjacent sub-segments of the plurality of separate sub-segments, the third compensation lines are insulated from the lines to be compensated electrically connected with the sub-segments, and electrically connected with other lines to be compensated.

Optionally, extension directions of the first compensation lines and the third compensation lines are the same as that of the data-signal lines, and are set in a same layer as the data-signal lines, the first compensation lines are electrically connected with the data-signal lines, and the third compensation lines are electrically connected with the gate-signal lines, or extension directions of the first compensation lines and the third compensation lines are the same as that of the gate-signal lines, and are set in the same layer as the gate-signal lines, the first compensation lines are electrically connected with the gate-signal lines, and the third compensation lines are electrically connected with the data-signal lines.

Optionally, the display area further includes a substrate, and a gate layer and a source-drain layer that are stacked in sequence on the substrate, and the gate layer and the source-drain layer are set to be insulated from each other, in a condition that the first compensation lines and the third compensation lines are set in a same layer as the data-signal lines, the first compensation lines and the third compensation lines are set in a same layer as the source-drain layer, or in a condition that the first compensation lines and the third compensation lines are set in a same layer as the gate-signal lines, the first compensation lines and the third compensation lines are set in a same layer as the gate layer.

Optionally, the display area further includes first connecting lines and second connecting lines, the first connecting lines and the second connecting lines are insulated from each other, the data-signal lines include data-signal lines to be compensated, and the gate-signal lines includes gate-signal lines to be compensated, in the condition that the first compensation lines and the third compensation lines are set in the same layer as the data-signal lines, extension directions of the second connection lines intersect with the extension directions of the data-signal lines, the second connection lines are set in a same layer as the data-signal lines to be compensated, and the first compensation lines are electrically connected with the data-signal lines to be compensated through the second connection lines, or in the condition that the first compensation lines and the third compensation lines are set in the same layer as the gate-signal lines, extension directions of the first connection lines intersect with the extension directions of the gate-signal lines, the first connection lines are set in a same layer as the gate-signal lines to be compensated, and the first compensation lines are electrically connected with the gate-signal lines to be compensated through the first connection lines.

Optionally, the display area further includes an interlayer-dielectric layer located between the gate layer and the source-drain layer, and through holes are provided in the interlayer-dielectric layer, in a condition that the first compensation lines and the third compensation lines are set in a same layer as the source-drain layer, the third compensation lines are electrically connected with the gate-signal lines to be compensated through the through holes, or in a condition that the first compensation lines and the third compensation lines are set in a same layer as the gate layer, the third compensation lines are electrically connected with the data-signal lines to be compensated through the through holes.

Optionally, a part of the first compensation lines are electrically connected with the data-signal lines, extension directions of the part of the first compensation lines are the same as that of the data-signal lines, and the part of the first compensation lines are set in a same layer as the data-signal lines; and another part of the first compensation lines are electrically connected with the gate-signal lines, extension directions of the another part of the first compensation lines are the same as that of the gate-signal lines, and the another part of the first compensation lines are set in a same layer as the gate-signal lines.

Optionally, the display area further includes first connecting lines and second connecting lines, the first connecting lines and the second connecting lines are insulated from each other, the data-signal lines include data-signal lines to be compensated, and the gate-signal lines includes gate-signal lines to be compensated, and extension directions of the second connection lines intersect with the extension directions of the data-signal lines, the second connection lines are set in a same layer as the data-signal lines to be compensated, and the first compensation lines are electrically connected with the data-signal lines to be compensated through the second connection lines; and extension directions of the first connection lines intersect with the extension directions of the gate-signal lines, the first connection lines are set in a same layer as the gate-signal lines to be compensated, and the first compensation lines are electrically connected with the gate-signal lines to be compensated through the first connection lines.

Optionally, the display area further includes a substrate, and a gate layer and a source-drain layer that are stacked in sequence on the substrate, and the gate layer and the source-drain layer are set to be insulated from each other, and a part of the first compensation lines are set in a same layer as the source-drain layer, and another part of the first compensation lines are set in a same layer as the gate layer.

Optionally, the display area further includes an interlayer-dielectric layer located between the gate layer and the source-drain layer, and through holes are provided in the interlayer-dielectric layer, and the first compensation lines set in the same layer with the source-drain layer are electrically connected with the gate-signal lines to be compensated through the through holes, and the first compensation lines set in the same layer with the gate layer are electrically connected with the data-signal lines to be compensated through the through holes.

On the other hand, an embodiment of the present application provides a display device, including the above display panel.

The above description is only an overview of the technical solutions of the application. In order to better understand the technical means of the application, so as to implement the technical means according to the contents of the specification, and in order to make the above and other purposes, features and advantages of the application more distinct and understandable, specific implementations of the application are listed below.

BRIEF DESCRIPTION OF THE DRAWINGS

In order to more clearly illustrate technical solutions in embodiments of the disclosure or in related technology, the followings will briefly introduce drawings needed to be used in illustrating the embodiments or the related technology. Apparently, the drawings in the following description are only some embodiments of the disclosure. For those ordinary skilled in the field, they may further obtain other drawings according to the provided drawings without paying creative labor.

DETAILED DESCRIPTION OF THE EMBODIMENTS

Figure 1:
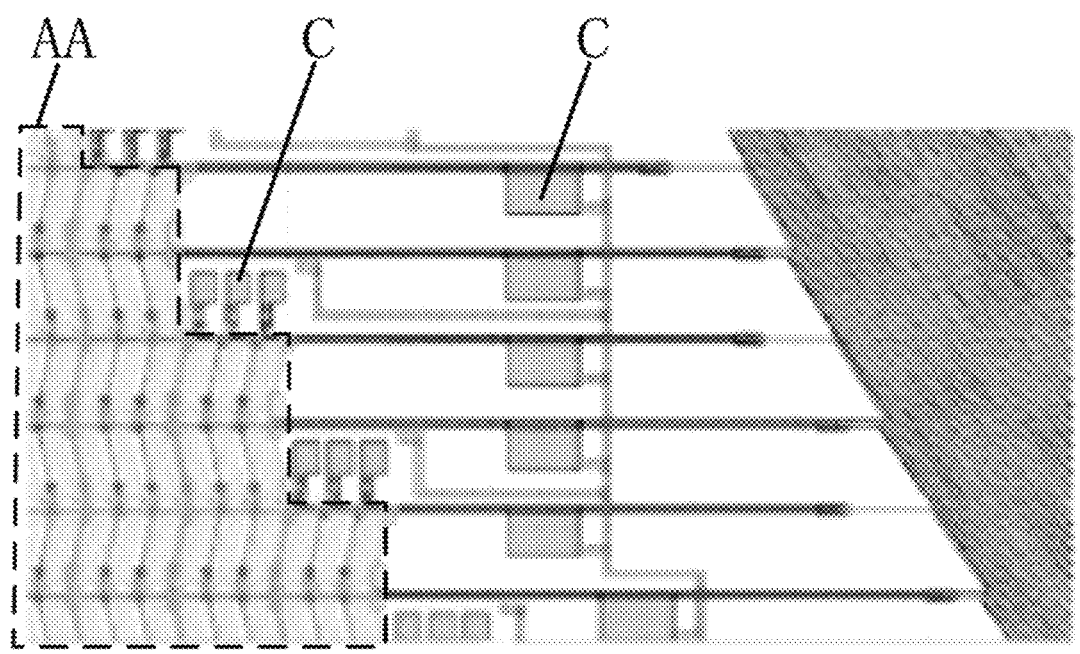
FIG. 1 is a schematic diagram showing capacitance compensation in the related technology.

In order to make purposes, technical solutions and advantages of embodiments of the application more distinct, the followings will describe the technical solutions in the embodiments of the application clearly and completely in combination with the drawings in the embodiments of the application. Apparently, the described embodiments are only a part of the embodiments of the application, not all of the embodiments of the application. Based on the embodiments in the application, all other embodiments obtained by the ordinary skilled in the art without doing creative work belong to the scope of protection in the application.

In the drawings, thicknesses of areas and layers may be exaggerated for clarity. The same reference numerals in the drawings represent the same or similar structures, so the detailed description thereof will be omitted. In addition, the drawings are only schematic illustrations of the application, and are not necessarily drawn to scale.

In the embodiments of the present application, unless otherwise stated, "a plurality of" means two or more. An orientation or position relationship indicated by a term "on" is based on the orientation or position relationship shown in the drawings, which is only for convenience of describing the application and simplifying the description, but not for indicating or implying that a structure or element being referred to, must have a specific orientation, or be constructed or operated in a specific orientation, so it shall not be understood as a restriction on the application.

Unless otherwise required by the context, in the entire specification and claims, the term "including" is interpreted as open and inclusive, which means "including, but not limited to". In the description of the specification, the terms "one embodiment", "some embodiments", "an exemplary embodiment", "an example", "a specific example" or "some examples", etc., are intended to indicate that specific features, structures, materials or characteristics related to the embodiment or example are included in at least one embodiment or example of the application. The illustrative representation of the above terms does not necessarily refer to the same embodiment or example. In addition, the above specific features, structures, materials or characteristics may be included in any one or more embodiments or examples in any appropriate manner.

In the embodiments of the present application, the words such as "first", "second", etc., are used to describe the same or similar items with basically the same function and action, only for the purpose of clearly describing the technical solutions of the embodiments of the present application, and shall not be understood as indicating or implying relative importance or implying quantity of an indicated technical feature.

At present, display devices are more and more widely used, and with continuous development of display technology, demands for display devices from users are increased constantly, display devices such as LCD (Liquid Crystal Display), OLED (Organic Light Emitting Diode), etc., are presented. On such basis, specially-shaped display devices are emerging as well. Here, the specially-shaped display devices refer to display devices having special shapes, formed on the basis of traditional display devices.

However, due to different lengths of signal lines in a current specially-shaped display panel, loading of different lengths of signal lines is inconsistent, resulting in apparent uneven displaying on a display panel, which gives poor user experience.

In the specially-shaped display device, because a shape of the display device is not a conventional rectangle, but a shape such as a diamond, a semi-ellipse, etc., there are signal lines having different lengths, such as gate-signal lines having different lengths, and data-signal lines having different lengths, in a display area of the display device. Since the signal lines have different lengths, resistances thereof must be different from each other. At the same time, due to different overlapping areas between the signal lines having different lengths and other film layers, capacitances therebetween must be different from each other, which leads to differences in loadings among the signal lines having different lengths, resulting in problems, such as uneven displaying presented the display device, etc., which is particularly serious for display devices of large size.

Figure 2:
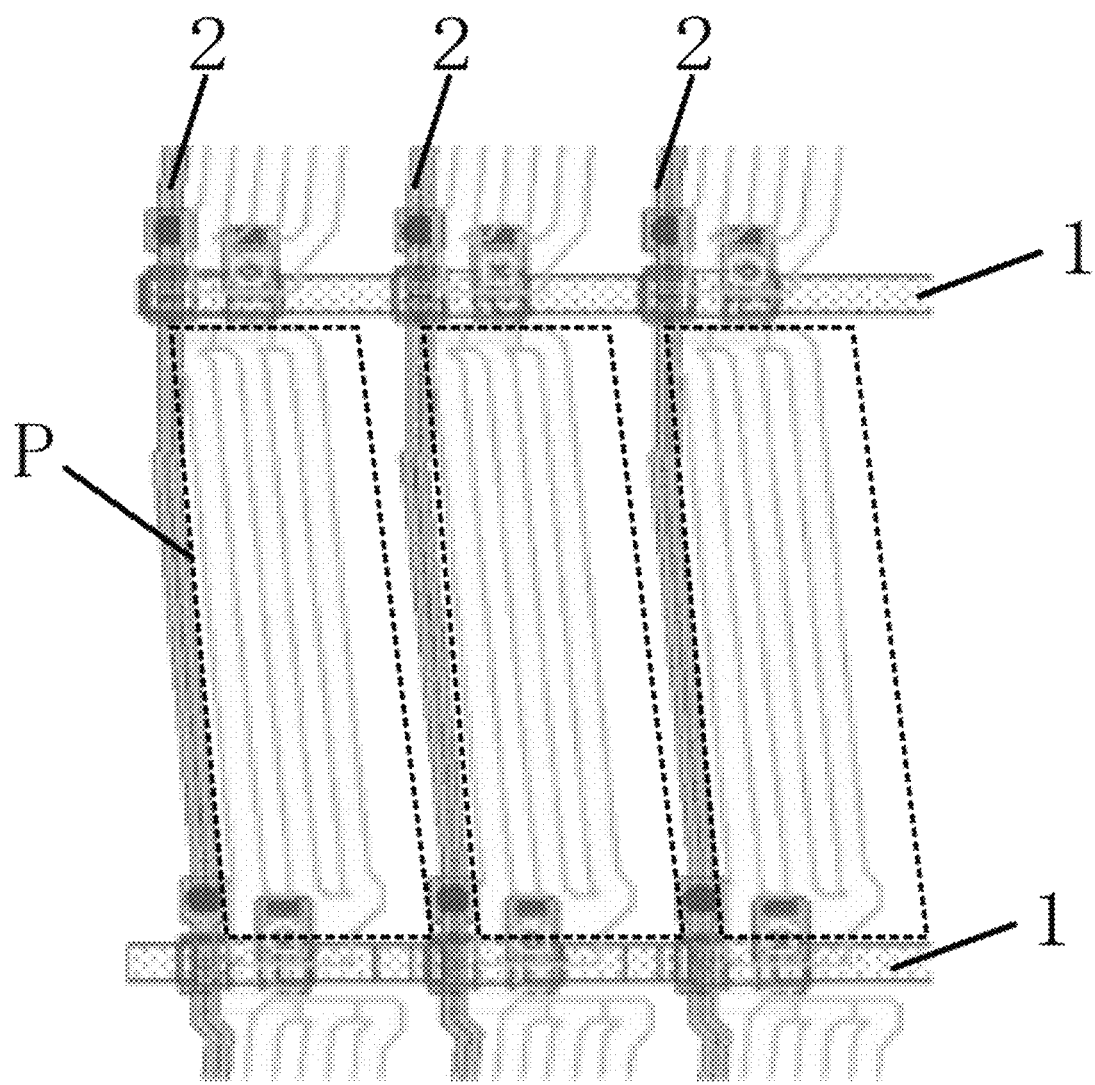
FIG. 2 is a schematic diagram showing a structure of pixels of a specially-shaped display panel in the related technology.
Figure 3:
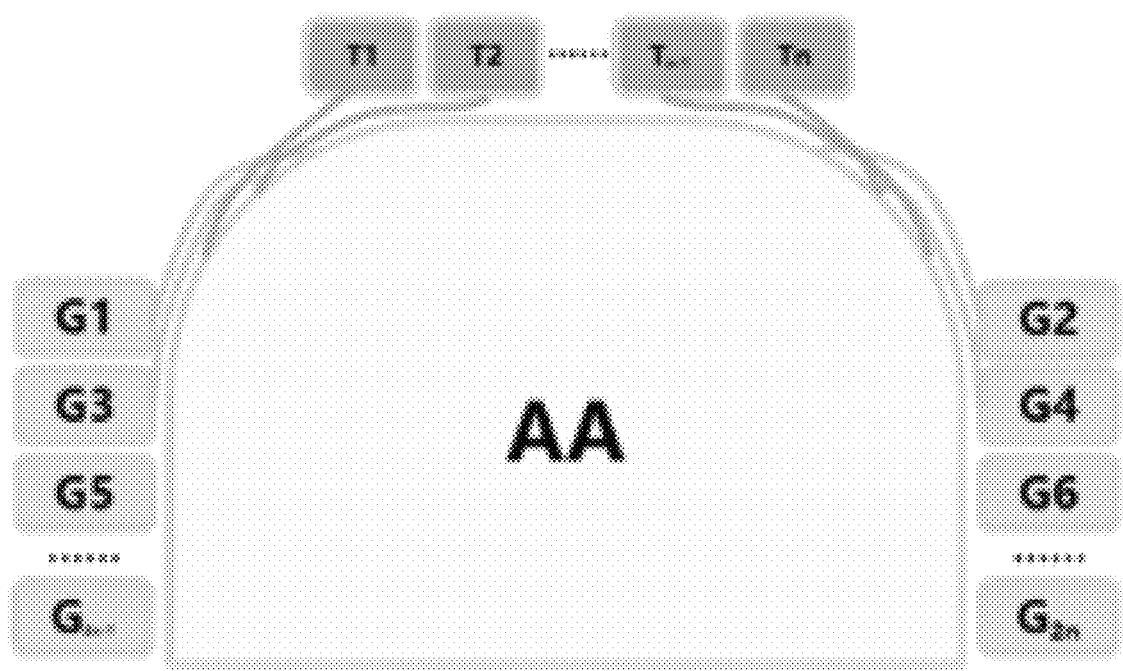
FIG. 3 is a schematic diagram showing a structure of a specially-shaped display panel in the related technology.

In order to solve the above problems, in related technology, improvements are often conducted in border areas connected with the display area. For example, different film layers in a border area are electrically connected to form capacitances C as shown in FIG. 1, to compensate capacitance differences of signal lines having different lengths (in FIG. 1, the compensation capacitances C are located on a right side of a display area AA, pixels are distributed in the display area AA as shown in FIG. 2, and in FIG. 2, it is drawn by taking three sub-pixels P defined by two gate-signal lines 1 and three data-signal lines 2, as an example), but this cannot compensate resistance differences among signal lines having different lengths. Alternatively, for example, wiring in the border area to compensate for loading differences of signal lines having different lengths, as shown in FIG. 3, gate drive lines G1-G2n and source drive lines T1-Tn are set in the border areas around the display area AA, but this will lead to a large border due to an increase of wiring in the border areas, which is difficult to meet design requirements of narrow border.

Figure 5:
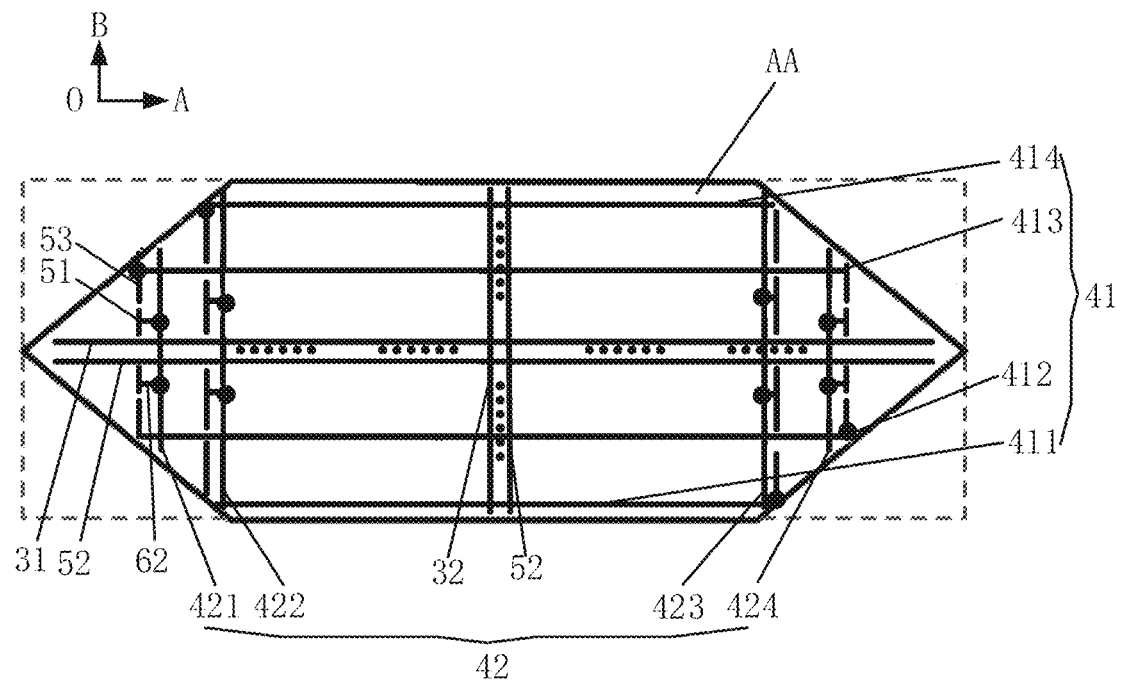
FIG. 5 is a schematic diagram showing a display area of another display panel provided by an embodiment of the present application.
Figure 6:
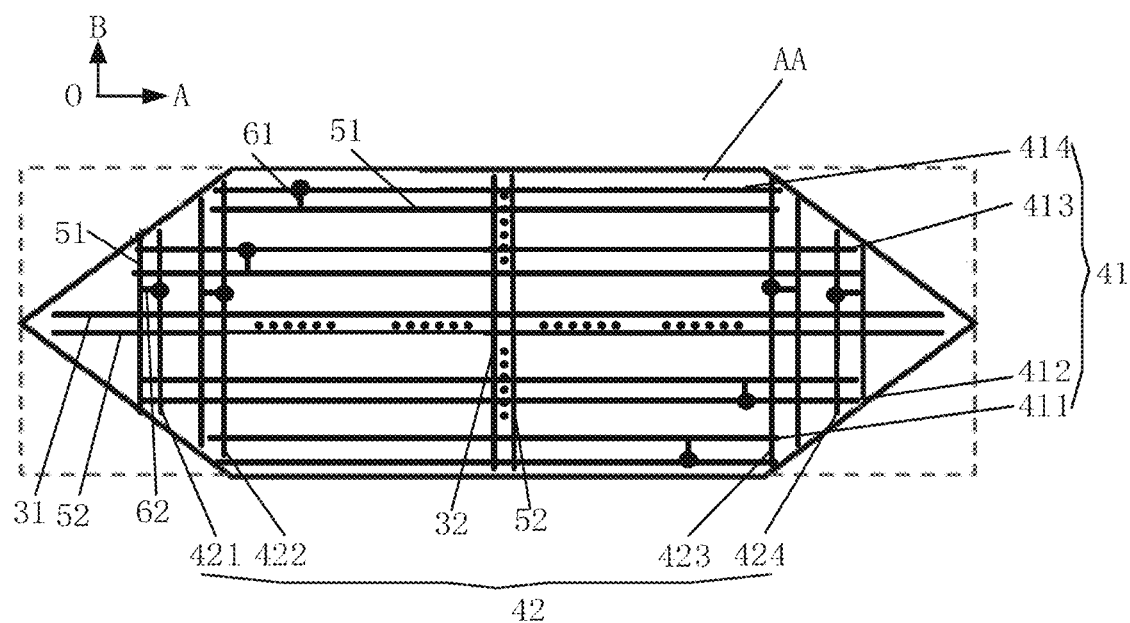
FIG. 6 is a schematic diagram showing a display area of further another display panel provided by an embodiment of the present application.

Based on the above, an embodiment of the present application provides a display panel, including a display area. Referring to that shown in FIG. 4, FIG. 5 and FIG. 6, the display area AA includes: a plurality of kinds of signal lines, the same kind of signal lines include reference lines (a reference gate-signal line 31 and a reference data-signal line 32 shown in FIG. 4, FIG. 5 and FIG. 6) and lines to be compensated (gate-signal lines 41 to be compensated and data-signal lines 42 to be compensated shown in FIG. 4. FIG. 5 and FIG. 6). Sizes of the lines to be compensated along extension directions of the lines to be compensated are smaller than sizes of the reference lines along extension directions of the reference lines.

Figure 4:
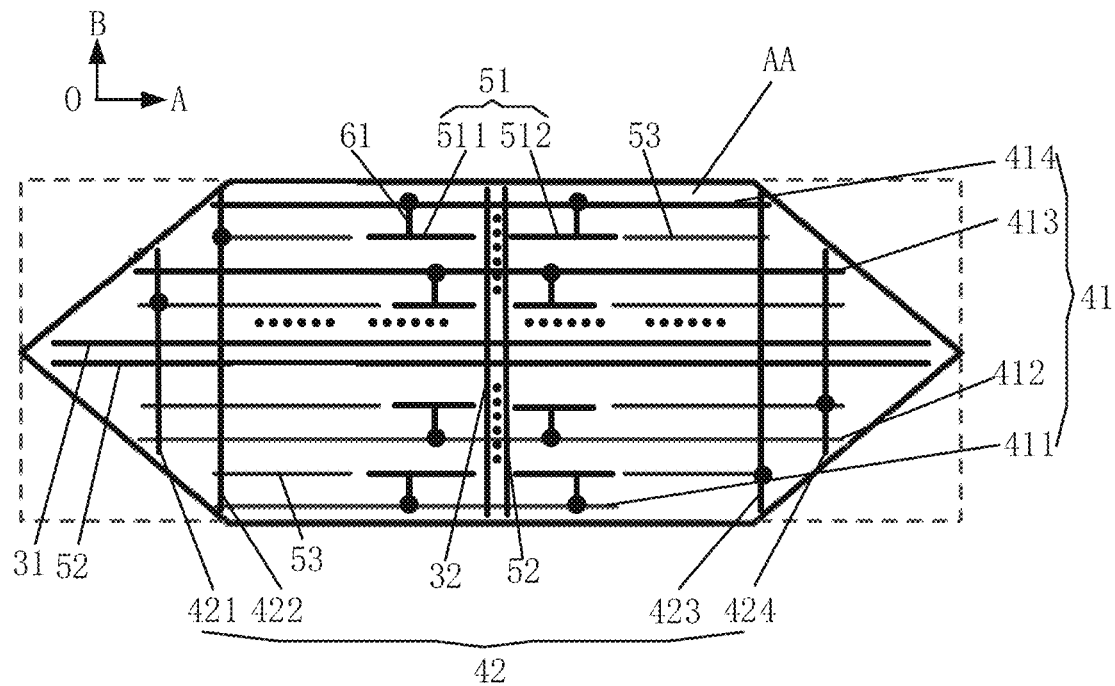
FIG. 4 is a schematic diagram showing a display area of a display panel provided by an embodiment of the present application.

Referring to that shown in FIG. 4, compensation lines include first compensation lines 51, and the first compensation lines 51 are electrically connected with the lines to be compensated, for compensating differences between the sizes of the lines to be compensated along the extension directions of the lines to be compensated and the sizes of the reference lines along the extension directions of the reference lines.

Among them, a number of the compensation lines is less than or equal to a number of the signal lines.

The above display panel may be a specially-shaped display panel, and a shape of the display panel may include diamond, semi-ellipse, circle, heart, triangle, trapezoid, fan, are, cylinder, polygon, etc. The specially-shaped display panel may be obtained by cutting a rectangular display panel made by an existing process.

The display area (AA) of the above display panel refers to an area for realizing displaying.

All of types, quantities, etc., of the above plurality of signal lines are not specifically restricted here. For example, the above plurality of signal lines may include the gate-signal lines, the data-signal lines, power lines, etc. For example, the above plurality of signal lines may include two kinds of signal lines, such as the gate-signal lines and the data-signal lines, or, such as the gate-signal lines and the power lines, or, such as the data-signal lines and the power lines. The above plurality of signal lines may include more than three kinds of signal lines as well. All of FIG. 4-FIG. 17 are drawn by taking that the plurality of signal lines include two kinds of signal lines and the two kinds of signal lines are respectively the gate-signal lines and the data-signal lines, as an example.

Figure 7:
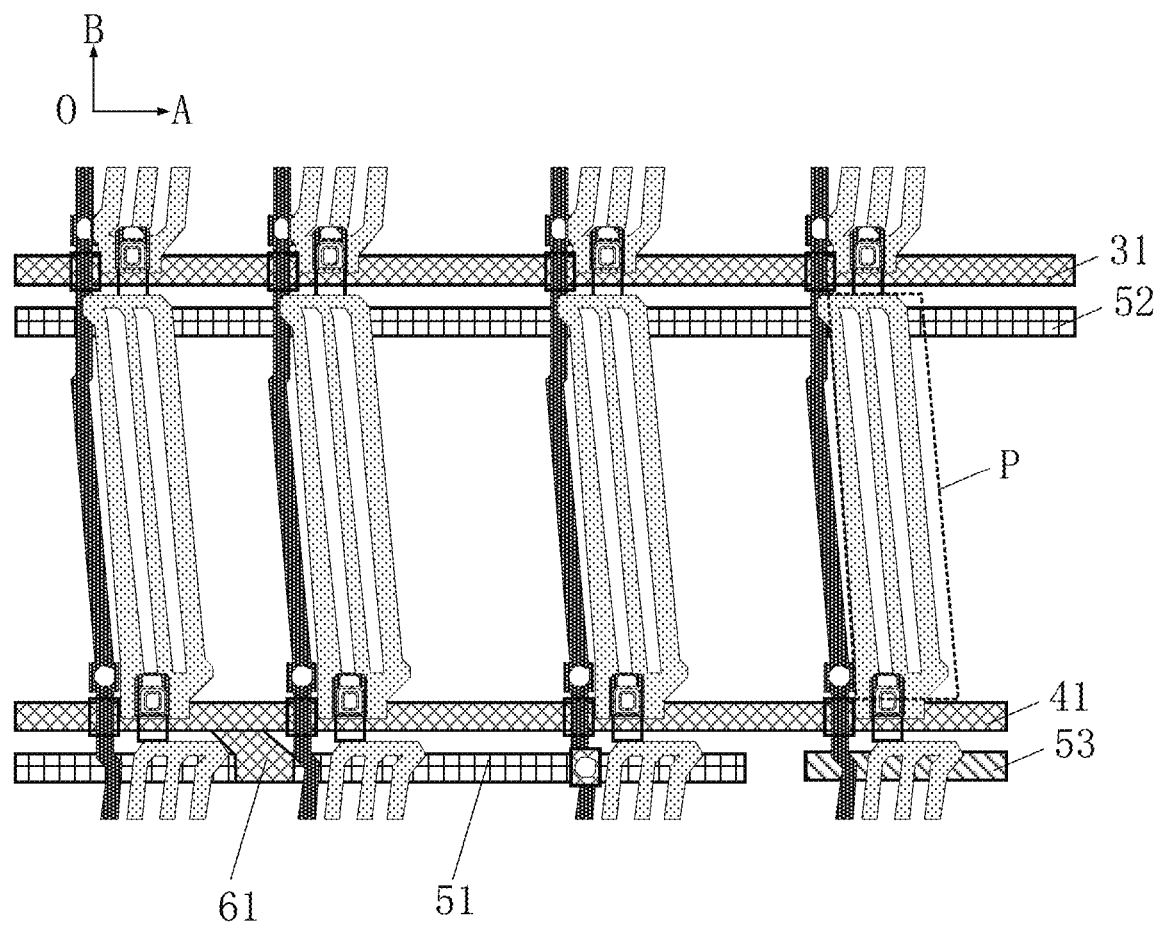
FIG. 7 is a schematic diagram showing a structure of pixels provided by an embodiment of the application.
Figure 17:
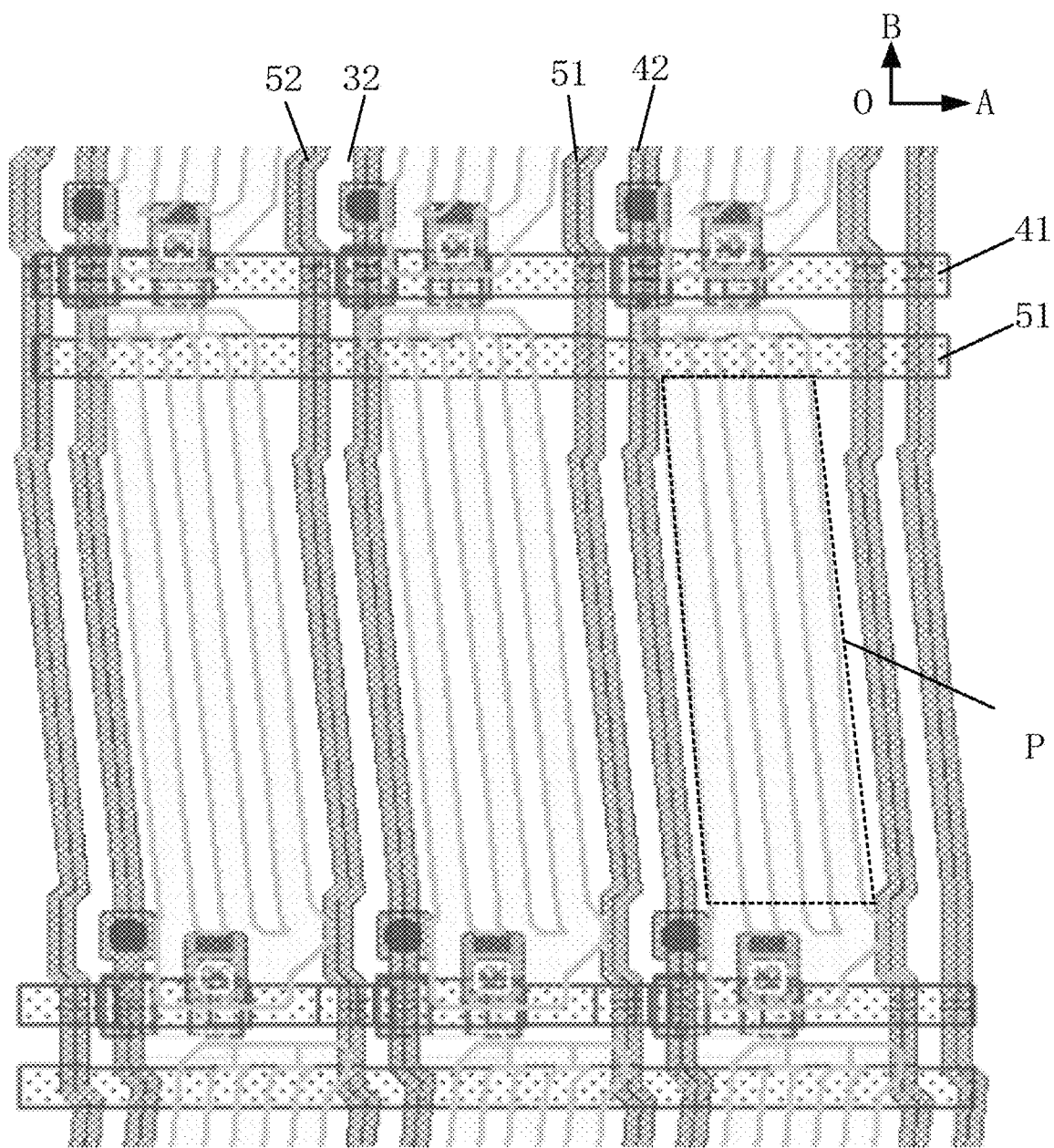
FIG. 17 is a schematic diagram showing a structure of a third kind of display panel provided by an embodiment of the application.

The number of the above plurality of signal lines is not specifically limited here. In a condition that the above plurality of signal lines include two kinds of signal lines and the two kinds of signal lines are respectively the gate-signal lines and the data-signal lines, as an example, numbers of the gate-signal lines and the data-signal lines may be the same. Alternatively, the numbers of the gate-signal lines and the data-signal lines may be different from each other. The actual numbers of the gate-signal lines and the data-signal lines are determined by a number of sub-pixels defined thereby, an area of the display panel, etc. All of FIG. 4-FIG. 6 are drawn by taking that the display panel includes five gate-signal lines and five data-signal lines, as an example. At this time, the numbers of the gate-signal lines and the data-signal lines are the same. Both FIG. 7 and FIG. 11 are drawn by taking that two gate-signal lines and four data-signal lines define four sub-pixels P, as an example. All of FIG. 8 (a)-FIG. 10 (b) and FIG. 12 (a)-FIG. 17 are drawn by taking that two gate-signal lines and three data-signal lines define three sub-pixels P, as an example. At this time, the numbers of the gate-signal lines and the data-signal lines are different from each other. It should be noted that, in actual products, the numbers of the gate-signal lines and the data-signal lines need to be determined according to the area of the display panel. For example, for a large size product, the numbers of the gate-signal lines and the data-signal lines are very large. FIG. 4, FIG. 5 and FIG. 6 do not show all of the gate-signal lines and the data-signal lines, so characters ". . . " are used for expressing omission.

The above same kind of signal lines include the reference line and the lines to be compensated. At this time, the reference line and the lines to be compensated are set in the same layer, and the extension direction of the reference line is the same as that of the lines to be compensated. In a condition that the above plurality of signal lines include two kinds of signal lines and the two kinds of signal lines are respectively the gate-signal lines and the data-signal lines, referring to that shown in FIG. 4, FIG. 5 and FIG. 6, the gate-signal lines may include the reference gate-signal line 31 and the gate-signal lines 41 to be compensated, the reference gate-signal line 31 and the gate-signal lines 41 to be compensated are set in the same layer, and the extension direction of the reference gate-signal line 31 is the same as that of the gate-signal lines 41 to be compensated. The data-signal lines may include the reference data-signal line 32 and the data-signal lines 42 to be compensated, the reference data-signal line 32 and the data-signal lines 42 to be compensated are set in the same layer, and the extension direction of the reference data-signal line 32 is the same as that of the data-signal lines 42 to be compensated.

The above reference line is the signal line having the largest size along the extension direction of the signal lines in the display panel, that is, the signal line having the longest length along the extension direction of the signal lines in the display panel. A specific number of the above reference lines is not limited here. For example, the number of the above reference line may be one. Alternatively, the number of the above reference lines may be plural, and the actual number of the reference lines may be determined according to a shape, the area, etc., of the specially-shaped display panel. All of FIG. 4, FIG. 5 and FIG. 6 are drawn by taking that the display area AA includes two reference lines and the two reference lines are respectively the reference gate-signal line 31 and the reference data-signal line 32, as an example.

The above lines to be compensated are the signal lines in the display panel whose sizes along the extension directions of the signal lines are smaller than that of the reference lines along the extension directions of the signal line, that is, the above lines to be compensated are the signal lines in the display panel whose extension lengths along the extension directions of the signal lines are not the longest one. All of a number, lengths, etc., of the above lines to be compensated are not specifically restricted here. For example, the number of the above line to be compensated may be one, or, it may be plural, and the actual number of the lines to be compensated may be determined according to the shape, the area, etc., of the specially-shaped display panel. When the number of the lines to be compensated is plural, all the lengths of the plurality of lines to be compensated may be the same, or the lengths of the plurality of lines to be compensated may be different from each other, alternatively, the lengths of the plurality of lines to be compensated may be partially the same. All of FIG. 4, FIG. 5 and FIG. 6 are drawn by taking that the display area AA includes eight lines to be compensated and the lengths of the eight lines to be compensated are partially the same, as an example. Referring to that shown in FIG. 4, FIG. 5 and FIG. 6, the display area AA includes four gate-signal lines 41 to be compensated, which are respectively a gate-signal line 411 to be compensated, a gate-signal line 412 to be compensated, a gate-signal line 413 to be compensated and a gate-signal line 414 to be compensated, and four data-signal lines 42 to be compensated, which are respectively a data-signal line 421 to be compensated, a data-signal line 422 to be compensated, a data-signal line 423 to be compensated and a data-signal line 424 to be compensated.

The above that the sizes of the lines to be compensated along the extension directions of the lines to be compensated are less than the sizes of the reference lines along the extension directions of the reference lines, means that the lengths of the lines to be compensated along the extension directions of the lines to be compensated are less than the lengths of the reference lines along the extension directions of the reference lines. In a condition that the plurality of signal lines include two kinds of signal lines, the two kinds of signal lines are respectively the gate-signal lines and the data-signal lines, the gate-signal lines include the reference gate-signal line and the gate-signal lines to be compensated, and the data-signal lines include the reference data-signal line and the data-signal lines to be compensated, the lengths of the gate-signal lines to be compensated along the extension directions of the gate-signal lines to be compensated are less than the length of the reference gate-signal line along the extension direction of the reference gate-signal line, and the lengths of the data-signal lines to be compensated along the extension directions of the data-signal lines to be compensated are less than the length of the reference data-signal line along the extension direction of the reference data-signal line. All of FIG. 4, FIG. 5 and FIG. 6 are drawn by taking that the extension directions of the gate-signal lines are an OA direction and the extension directions of the data-signal lines is an OB direction, as an example. Referring to that shown in FIG. 4, FIG. 5 and FIG. 6, the length of the reference gate-signal line 31 along the OA direction is the longest, and the lengths of all of the four gate-signal lines 41 to be compensated along the OA direction are less than the length of the reference gate-signal line 31 along the OA direction. Among the four gate-signal lines 41 to be compensated, the length of the gate-signal line 411 to be compensated is the shortest, the lengths of both the gate-signal line 412 to be compensated and the gate-signal line 413 to be compensated are the longest, and the length of the gate-signal line 414 to be compensated is in the middle therebetween. Referring to that shown in FIG. 4, FIG. 5 and FIG. 6, the length of reference data-signal line 32 along the OB direction is the longest, and the lengths of four data-signal lines 42 to be compensated along the OB direction are less than the length of reference data-signal line 32 along the OB direction. Among the four data-signal lines 42 to be compensated, the lengths of both the data-signal line 421 to be compensated and the compensation data-signal line 424 are the shortest, and the lengths of both the data-signal line 422 to be compensated and the compensation data-signal line 423 are the longest.

The types, kinds, the quantities, etc., of the above compensation lines are not specifically restricted here. For example, the above compensation lines may include gate loading compensation lines, data loading compensation lines, power loading compensation lines, etc. For example, the above compensation lines may include two kinds of compensation lines, such as the gate loading compensation lines and the data loading compensation lines, or, such as the gate loading compensation lines and the power loading compensation lines, or, such as the data loading compensation lines and the power loading compensation lines. The above compensation lines may include more than three kinds of compensation lines as well. FIG. 4 is drawn by taking that the compensation lines include one kind of compensation lines, that is, the gate loading compensation lines, as an example. Referring to that shown in FIG. 4 and FIG. 7, the gate loading compensation lines may include the first compensation lines 51, a second compensation line 52 and third compensation lines 53, set in the same layer and along the same extension direction, wherein the first compensation lines 51 and the third compensation lines 53 are collinear and set to correspond to the gate-signal lines 41 to be compensated, the first compensation lines 51 are electrically connected with the correspondingly-set gate-signal lines 41 to be compensated, the third compensation lines 53 are electrically connected with the data-signal lines 42 to be compensated, and the second compensation line 52 is set to correspond to and be insulated from the reference gate-signal line 31.

FIG. 5 is drawn by taking that the compensation lines include one kind of compensation lines, that is, the data loading compensation lines, as an example. Referring to FIG. 5 and FIG. 11, the data loading compensation lines include the first compensation lines 51, the second compensation line 52 and the third compensation lines 53, set in the same layer and along the same extension direction, wherein the first compensation lines 51 and the third compensation lines 53 are collinear and are set to correspond to the data-signal lines 42 to be compensated, the first compensation lines 51 are electrically connected with the correspondingly-set data-signal lines 42 to be compensated, the third compensation lines 53 are electrically connected with the gate-signal lines 41 to be compensated, and the second compensation line 52 is set to correspond to and be insulated from the reference data-signal line 32.

FIG. 6 is drawn by taking that the compensation lines include two kinds of compensation lines, namely, the gate loading compensation line and the data loading compensation line, as an example. Referring to that shown in FIG. 6 and FIG. 17, the gate loading compensation lines include a part of the first compensation lines 51, the second compensation lines 52 and the third compensation lines 53 (the third compensation lines 53 may be referred to in FIG. 4), set in the same layer and along the same extension direction, wherein the first compensation lines 51 and the third compensation lines 53 are collinear and set to correspond to the gate-signal lines 41 to be compensated, the first compensation lines 51 are electrically connected with the correspondingly-set gate-signal lines 41 to be compensated, the third compensation lines 53 are electrically connected with the data-signal lines 42 to be compensated, and the second compensation line 52 is set to correspond to and be insulated from the reference gate-signal line 31. The data loading compensation lines include another part of the first compensation lines 51, the second compensation lines 52 and the third compensation lines 53 (the third compensation lines 53 may be referred to in FIG. 5), set in the same layer and along the same extension direction, wherein the first compensation lines 51 and the third compensation lines 53 are collinear and set to correspond to the data-signal lines 42 to be compensated, the first compensation lines 51 are electrically connected with the correspondingly-set data-signal lines 42 to be compensated, the third compensation lines 53 are electrically connected with the gate-signal lines 41 to be compensated, and the second compensation line 52 is set to correspond to and be insulated from the reference data-signal line 32.

A structure of the first compensation line is not specifically restricted here. For example, the first compensation line may be an integral structure, alternatively, the first compensation line may include a plurality of segments, and the respective segments are electrically connected with the corresponding lines to be compensated. FIG. 4 is drawn by taking that the first compensation line 51 includes two segments and the two segments are respectively a segment 511 and a segment 512, as an example, and FIG. 6 is drawn by taking that the first compensation line 51 may be set as a whole.

The above first compensation lines are electrically connected with the lines to be compensated, and the specific manner of electrical connection is not limited here. For example, the first compensation lines and the lines to be compensated may be directly electrically connected. alternatively, the first compensation lines and the lines to be compensated may be indirectly electrically connected. All of FIG. 4, FIG. 5 and FIG. 6 are drawn by taking that the first compensation lines 51 and the gate-signal lines 41 to be compensated are electrically connected through first connection lines 61, and the first compensation lines 51 and the data-signal lines 42 to be compensated are electrically connected through second connection lines 62, as an example.

The number of the above compensation lines is less than or equal to the number of the signal lines. The followings will specifically illustrate a relationship between the number of the compensation lines and the number of the signal lines in different conditions, by taking that the signal lines include the gate-signal lines and the data-signal lines, as an example. Referring to that shown in FIG. 4 and FIG. 5, a compensation line is disconnected to form the first compensation lines 51 and the third compensation lines 53 that are in the same layer and collinear, therefore, the first compensation lines 51 and the third compensation lines 53 may be looked as one compensation line, that is, the extension directions of all of the compensation lines in FIG. 4 are the same as the extension directions of the gate-signal lines, and one compensation line is set to correspond to one gate-signal line to be compensated (regardless of whether the reference gate-signal line 31 is provided with the second compensation line 52), so, the number of the compensation lines is less than the number of the signal lines in all conditions. Similarly, in FIG. 5, the extension directions of all of the compensation lines are the same as the extension directions of the data-signal lines, and one compensation line is set to correspond to one data-signal line to be compensated (regardless of whether the reference data-signal line 32 is provided with the second compensation line 52), so, the number of the compensation lines is less than the number of the signal lines in all conditions.

Referring to that shown in FIG. 6, the gate-signal lines are set to correspond to a part of the first compensation lines 51, and the data-signal lines are set to correspond to another part of the first compensation lines 51, therefore, when the reference gate-signal line 31 is not provided with the second compensation line 52 and/or the reference data-signal line 32 is not provided with second compensation line 52, the number of the compensation lines is less than the number of the signal lines in all conditions. However, if the reference gate-signal line 31 is provided with the second compensation line 52 and the reference data-signal line 32 is provided with the second compensation line 52, the number of the compensation lines is equal to the number of the signal lines.

It should be noted that a dotted-line box in FIG. 4, FIG. 5 and FIG. 6 represents a border of a conventional rectangular display panel. The dotted-line box is drawn here only to highlight a specially-shaped border of the display panel of the application, and has no practical significance.

The embodiments of the application provide the display panel, including the display area. The display area includes: the plurality of kinds of signal lines, wherein the same kind of signal lines include the reference lines and the lines to be compensated, and the sizes of the lines to be compensated along the extension directions of the lines to be compensated are smaller than the sizes of the reference lines along the extension directions of the reference lines; and compensation lines, including the first compensation lines, wherein the first compensation lines are electrically connected with the lines to be compensated, and are configured to compensate for the differences between the sizes of the lines to be compensated along the extension directions of the lines to be compensated and the sizes of the corresponding reference lines along the extension directions of the corresponding reference lines; wherein the number of the compensation lines is less than or equal to the number of the signal lines. In this way, on the one hand, by compensating for the differences between the sizes of the lines to be compensated along the extension directions of the lines to be compensated and the sizes of the corresponding reference line along the extension directions of the corresponding reference line, loading compensation may be effectively carried out for the lines to be compensated by the compensation lines (the loading compensation includes capacitance compensation and resistance compensation), thus effectively improving displaying uniformity of the display panel. On the other hand, the compensation lines are set in the display area of the display panel, and do not occupy a position of a non-displaying area in the display panel, which may effectively reduce a width of the non-displaying area, so as to make the display panel achieve a narrow border.

Figure 8:
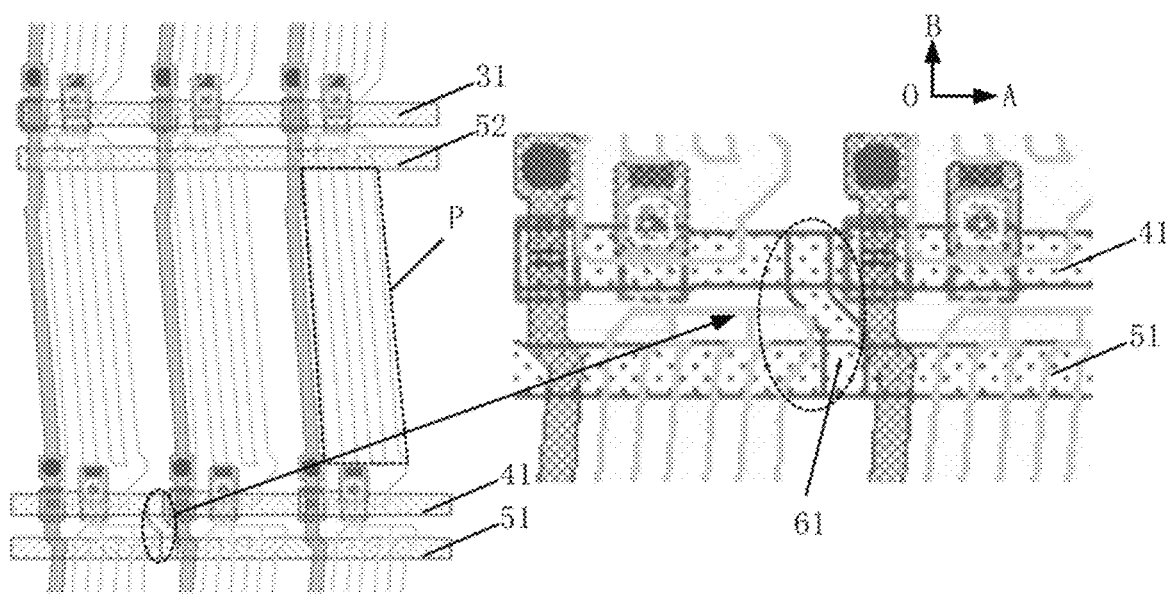
FIG. 8 (*a*) is a schematic diagram showing a structure of a first kind of display panel provided by an embodiment of the application, and FIG. 8 (*b*) is a view enlarging an electrical connection between a first compensation line and a gate-signal line to be compensated in the FIG. 8 (*a*).
Figure 9:
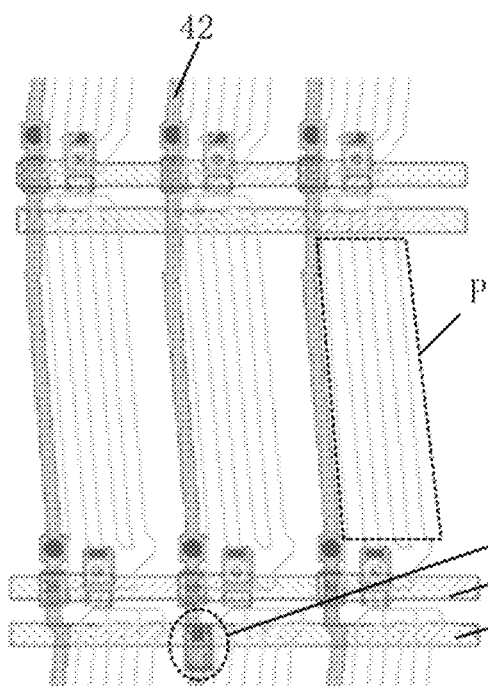
FIG. 9 (*c*) is a schematic diagram showing a structure of a first kind of display panel provided by an embodiment of the application, and FIG. 9 (*d*) is a view enlarging an electrical connection between a third compensation line and a data-signal line to be compensated in the FIG. 9 (*c*).
Figure 9:
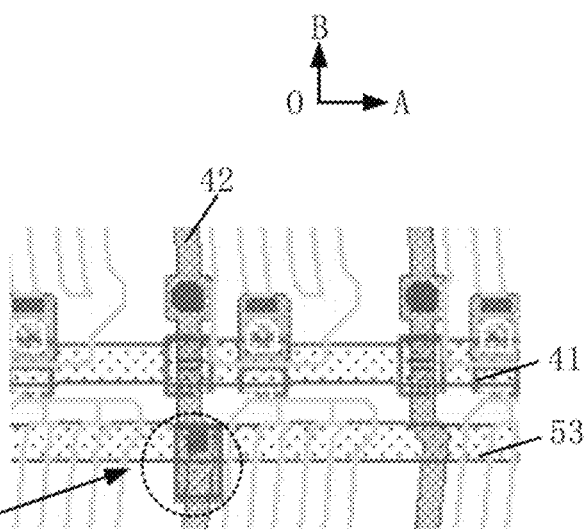
Figure 12:
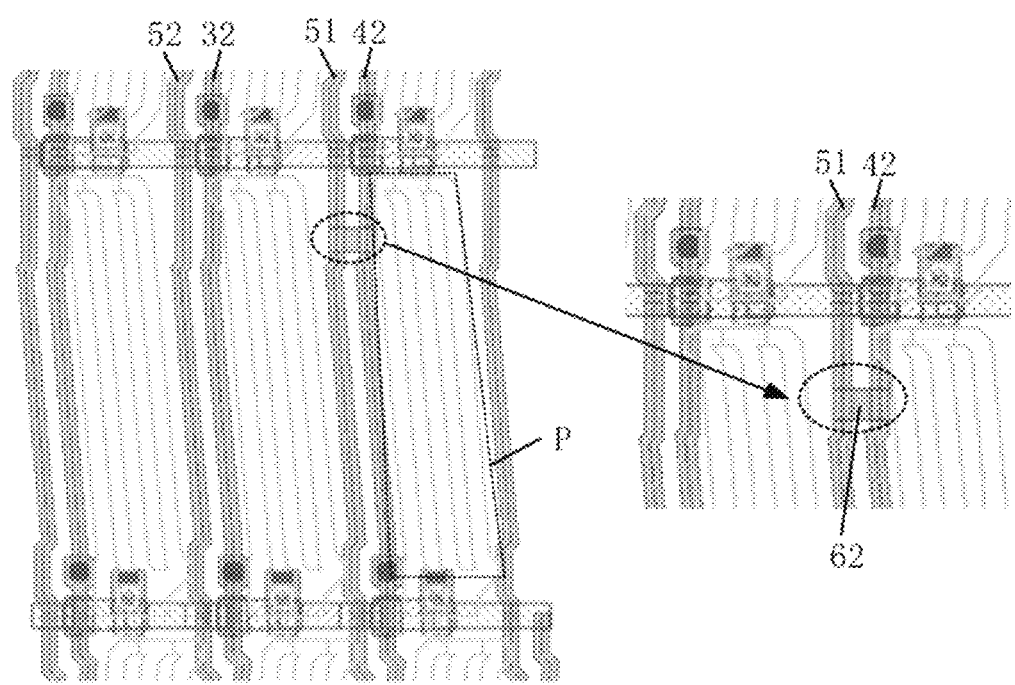
FIG. 12 (*a*) is a schematic diagram showing a structure of a second kind of display panel provided by an embodiment of the application, and FIG. 12 (*b*) is a view enlarging an electrical connection between a first compensation line and a data-signal line to be compensated in the FIG. 12 (*a*).
Figure 13:
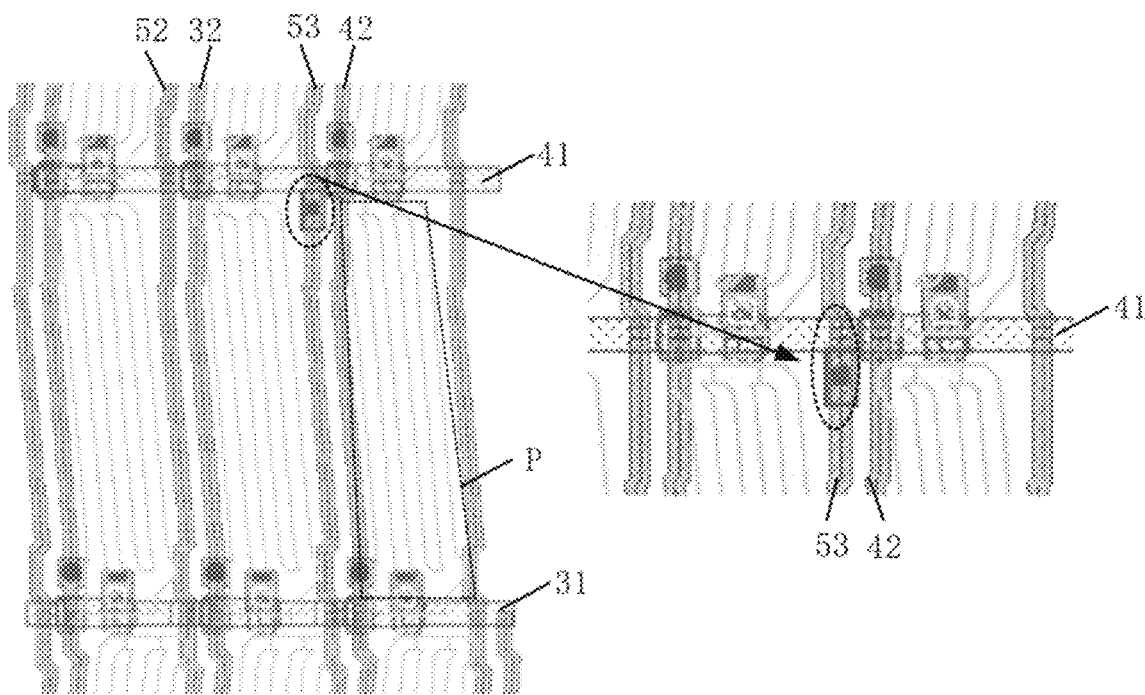
FIG. 13 (*c*) is a schematic diagram showing a structure of a second kind of display panel provided by an embodiment of the application, and FIG. 13 (*d*) is a view enlarging an electrical connection between a third compensation line and a gate-signal line to be compensated in the FIG. 13 (*c*).
Figure 14:
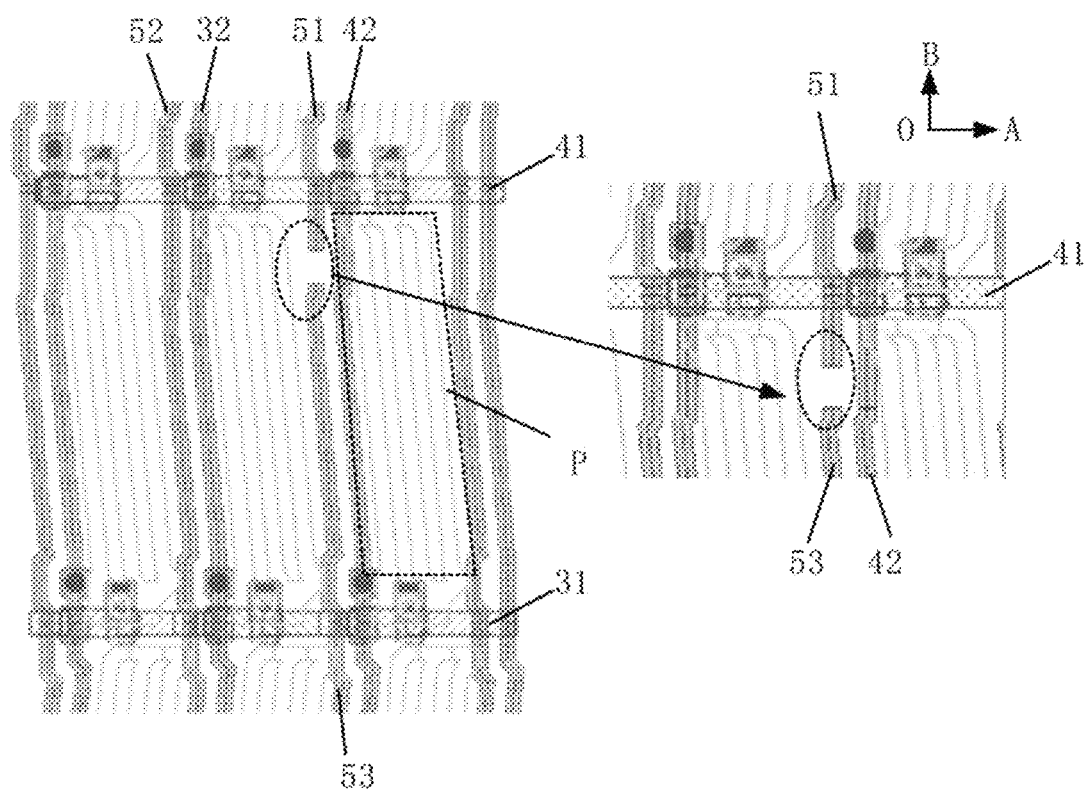
FIG. 14 (*a*) is a schematic diagram showing a structure of a second kind of display panel provided by an embodiment of the application, and FIG. 14 (*b*) is a view enlarging a disconnection between a first compensation line and a third compensation line in the FIG. 14 (*a*).

Optionally, referring to FIG. 4, FIG. 7, FIG. 8 (a)-FIG. 8 (b) and FIG. 12 (a)-FIG. 12 (b), the plurality of kinds of signal lines include the gate-signal lines and the data-signal lines, and the gate-signal lines intersect with and are insulated from the data-signal lines.

In a condition that the number of the compensation lines is less than the number of the signal lines, the number of the compensation lines is equal to the number of the gate-signal lines. Alternatively, in a condition that the number of the compensation lines is less than the number of the signal lines, the number of the compensation lines is equal to the number of the data-signal lines.

The extension directions of both the above gate-signal lines and data-signal lines are not specifically restricted here. All of FIG. 4, FIG. 7, FIG. 8 (a)-FIG. 8 (b) and FIG. 12 (a)-FIG. 12 (b) are drawn by taking that the extension directions of the gate-signal lines are the OA direction and the extension directions of the data-signal lines are the OB direction, as an example.

Figure 18:
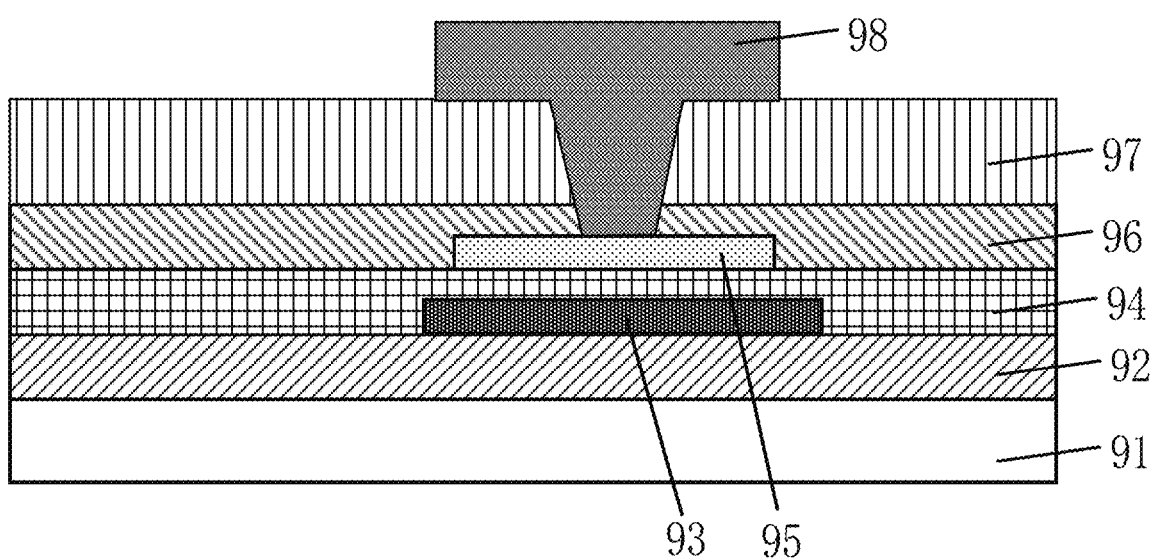
FIG. 18 is a sectional view of a display panel provided by an embodiment of the present application.

The above that the gate-signal lines are insulated from the data-signal lines, is referred to that: referring to that shown in FIG. 18, the display panel includes: a substrate 91, and a buffer layer 92, an active layer 93, a gate-insulation layer 94, a gate layer 95, a first insulation layer 96, a interlayer-dielectric layer 97 and a source-drain layer 98 that are stacked in sequence on the substrate 91, wherein the gate-signal lines and the gate layer 95 are set in the same layer, and the data-signal lines and the source-drain layer 98 are set in the same layer.

The above that, in the condition that the number of the compensation lines is less than the number of the signal lines, the number of the compensation lines is equal to the number of the gate-signal lines, is referred to that: referring to that shown in FIG. 4, FIG. 7 and FIG. 8 (a)-FIG. 8 (b), the extension directions of the compensation lines may be the same as that of the gate-signal lines, and the compensation lines include the first compensation lines 51 and the third compensation lines 53 that are collinear (the first compensation lines 51 and the third compensation lines 53 are set as a whole to correspond to the corresponding gate-signal lines 41 to be compensated), and include the second compensation lines 52 (the second compensation lines 52 are set to correspond to the corresponding reference gate-signal lines 31). At this time, both the reference gate-signal line 32 and the gate-signal line 41 to be compensated are set to correspond to one compensation line.

The above that, in the condition that the number of the compensation lines is less than the number of the signal lines, the number of the compensation lines is equal to the number of the data-signal lines, is referred to that: referring to that shown in FIG. 5, FIG. 11 and FIG. 12 (a)-FIG. 12 (b), the extension directions of the compensation lines may be the same as that of the data-signal lines, and the compensation lines include the first compensation lines 51 and the third compensation lines 53 that are collinear (the first compensation lines 51 and the third compensation lines 53 are set as a whole to correspond to the corresponding the data-signal lines 42 to be compensated), and include the second compensation lines 52 (the second compensation lines 52 are set to correspond to the corresponding reference data-signal lines 32). At this time, both the reference data-signal line 32 and the data-signal line 42 to be compensated are set to correspond to one compensation line.

In the display panel provided by the embodiments of the application, by setting the number of the compensation lines equal to the number of the gate-signal lines/the data-signal lines, the loading compensation may be carried out for the gate-signal lines to be compensated and the data-signal lines to be compensated through the compensation lines along the same extension direction as that of the gate-signal lines/the data-signal lines, such that it may effectively improve the displaying uniformity of the display panel, and at the same time, because the number of the set compensation lines is small, it may effectively improve pixel opening rates, simplify manufacturing processes, and reduce costs as well.

Optionally, referring to that shown in FIG. 6 and FIG. 17, the plurality of kinds of signal lines include the gate-signal lines and the data-signal lines, and the gate-signal lines intersect with and are insulated from the data-signal lines.

In a condition that the number of the compensation lines is equal to the number of the signal lines, the number of a part of the compensation lines is equal to the number of the gate-signal lines, and the number of another part of the compensation lines is equal to the number of the data-signal lines.

The extension directions of the above gate-signal lines and data-signal lines are not specifically restricted here. FIG. 17 is drawn by taking that the extension directions of the gate-signal lines are the OA direction, and the extension directions of the data-signal lines are the OB direction, as an example.

The above that the gate-signal lines are insulated from the data-signal lines, is referred to that: referring to that shown in FIG. 18, the display panel includes: the substrate 91, and the buffer layer 92, the active layer 93, the gate-insulation layer 94, the gate layer 95, the first insulation layer 96, the interlayer-dielectric layer 97 and the source-drain layer 98 that are stacked in sequence on the substrate 91, wherein the gate-signal lines and the gate layer 95 are set in the same layer, and the data-signal lines and the source-drain layer 98 are set in the same layer.

The above that the number of the part of the compensation lines is equal to the number of the gate-signal lines, and the number of the another part of the compensation lines is equal to the number of the data-signal lines, is referred to that: referring to that shown in FIG. 6 and FIG. 17, the extension directions of the part of the compensation lines may be the same as that of the gate-signal lines, and the compensation lines include the part of the first compensation lines 51 and the third compensation lines 53 that are collinear (the first compensation lines 51 and the third compensation lines 53 are set as a whole to correspond to the corresponding gate-signal lines 41 to be compensated), and include the part of the second compensation lines 52 (the second compensation lines 52 are set to correspond to the corresponding reference gate-signal lines 31), and at this time, both the reference gate-signal line 31 and the gate-signal line 41 to be compensated are set to correspond to one compensation line; and at the same time, the extension directions of the another part of the compensation lines may be the same as that of the data-signal lines, and the compensation lines include the another part of the first compensation lines 51 and the third compensation lines 53 that are collinear (the first compensation lines 51 and the third compensation lines 53 are set as a whole to correspond to the corresponding data-signal lines 42 to be compensated), and include the another part of the second compensation lines 52 (the second compensation lines 52 are set to correspond to the corresponding reference data-signal lines 32), and at this time, both the reference data-signal line 32 and the data-signal line 42 to be compensated are set to correspond to one compensation line.

Resistances per unit length and per unit area of the gate loading compensation lines along the same extension direction as that of the gate-signal lines and of the data loading compensation lines along the same extension direction as that of the data-signal lines are different from each other, therefore, in order to avoid that loadings on the lines to be compensated are not completely compensated for, in the display panel provided by the embodiments of the application, the number of the compensation lines is set to be equal to the number of the gate-signal lines and the data-signal lines, to ensure that each of the lines to be compensated is set to correspond to a compensation line, so as to ensure that all of the lines to be compensated may realize the loading compensation required thereby, as much as possible, that is, to ensure that all of the gate-signal lines to be compensated and all of the data-signal lines to be compensated may realize the loading compensation required thereby, thus effectively ensuring compensation effect thereof.

Optionally, referring to that shown in FIG. 7-FIG. 17, the display panel includes a plurality of sub-pixels P arranged in an array, and the gate-signal lines and data-signal lines define an area at which the sub-pixels P are located. The first compensation lines 51 and the line to be compensated electrically connected therewith are located between adjacent sub-pixels P. Thus, it may not only realize that the first compensation lines carry out the loading compensation for the line to be compensated electrically connected therewith, but also avoid affecting an opening rate of the display panel as much as possible.

The number of the above sub-pixels is not specifically limited here. For example, the number of the above sub-pixel may be one, alternatively, the number of the sub-pixels may be plural, and the number of the sub-pixels may be determined according to the number of the gate-signal lines and the data-signal lines. Both FIG. 7 and FIG. 11 are drawn by taking that the display panel includes four sub-pixels P, as an example. All of FIG. 8 (*a*)-FIG. 10 (*b*) and FIG. 12 (*a*)-FIG. 17 are drawn by taking that the display panel includes three sub-pixels P, as an example.

Colors of the above sub-pixels are not specifically restricted here. In a condition that the display panel includes a plurality of sub-pixels, the colors of all of the above sub-pixels may be the same; alternatively, the colors of the above sub-pixels may be partially the same; alternatively, the colors of all of the above sub-pixels may be different from each other. For example, the display panel may include red sub-pixels, green sub-pixels and blue sub-pixels.

Referring to that shown in FIG. 7 and FIG. 8 (*a*)-FIG. 8 (*b*), the first compensation line 51 and the gate-signal line 41 to be compensated electrically connected therewith are located between adjacent sub-pixels P. Referring to that shown in FIG. 11 and FIG. 12 (*a*)-FIG. 12 (*b*), the first compensation line 51 and the data-signal line 42 to be compensated electrically connected therewith are located between adjacent sub-pixels P.

Figure 10:
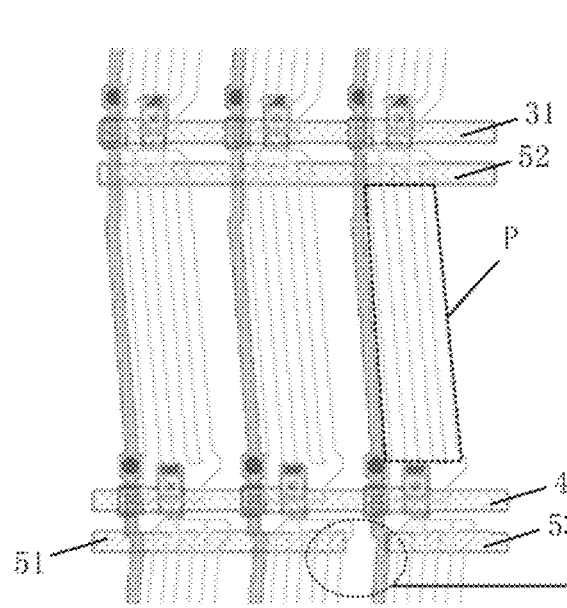
FIG. 10 (*a*) is a schematic diagram showing a structure of a first kind of display panel provided by an embodiment of the application, and FIG. 10 (*b*) is a view enlarging a disconnection between a first compensation line and a third compensation line in the FIG. 10 (*a*).
Figure 10:
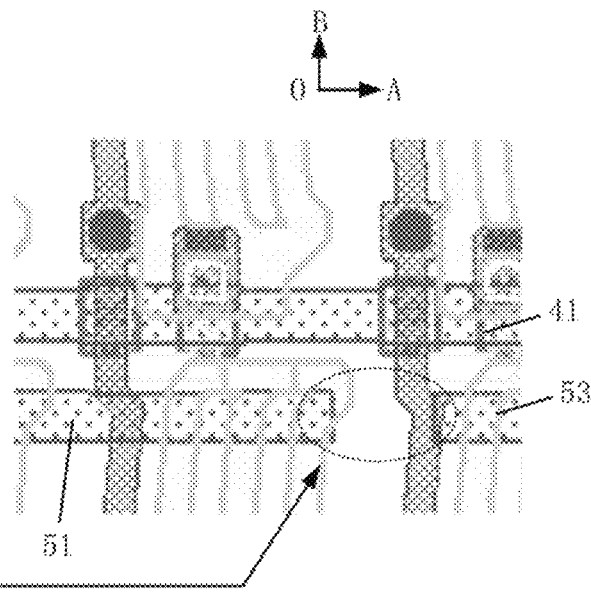
Figure 11:
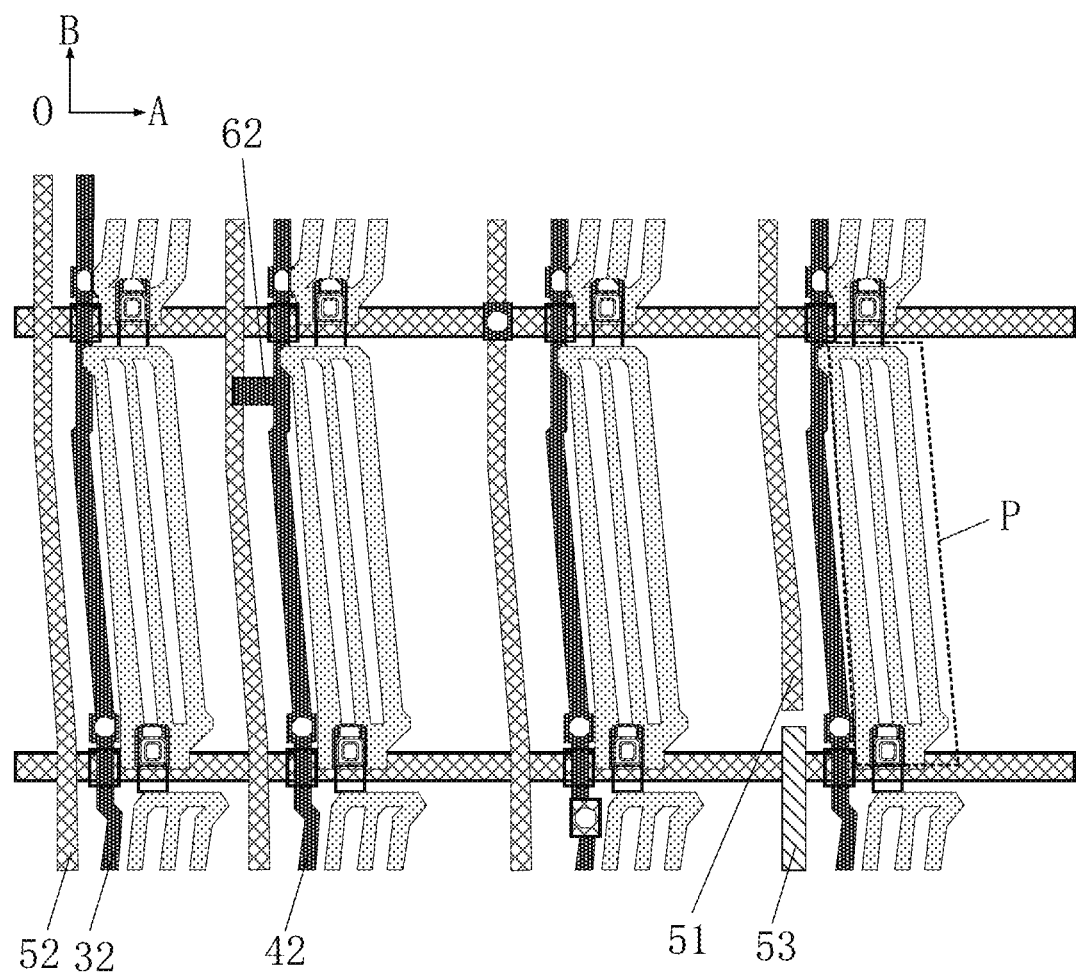
FIG. 11 is a schematic diagram showing another structure of pixels provided by an embodiment of the application.

Optionally, referring to that shown in FIG. 7, FIG. 8 (*a*)-FIG. 8 (*b*), FIG. 10 (*a*)-FIG. 17, the compensation lines further include the second compensation lines 52. The extension directions of the second compensation lines 52 are the same as that of the first compensation lines 51, and the second compensation lines 52 are insulated from all of the signal lines. The second compensation lines 52 are set between adjacent sub-pixels, between which no first compensation line 51 is located. Thus, the displaying uniformity of the display panel is further improved by setting the second compensation lines.

The number of the above second compensation lines is not specifically limited here. For example, the number of the second compensation line may be one, alternatively, the number of the second compensation lines may be plural, and the number of the second compensation lines may be determined according to the numbers of the reference gate-signal lines and the reference data-signal lines. All of FIG. 4. FIG. 5 and FIG. 6 are drawn by taking that the compensation lines 52 include two compensation lines 52, which are respectively the second compensation line 52 corresponding to the reference gate-signal line 31 and the second compensation line 52 corresponding to the reference data-signal line 32, as an example.

That the extension directions of the second compensation lines 52 are the same as that of the first compensation lines 51. includes: in a condition that the extension directions of the first compensation lines are the same as that of the gate-signal lines, the extension directions of the second compensation lines are the same as that of the gate-signal lines; alternatively, in a condition that the extension directions of the first compensation lines are the same as that of the data-signal lines, the extension directions of the second compensation lines are the same as that of the data-signal lines; alternatively, in a condition that the extension directions of a part of the first compensation lines are the same as that of the gate-signal lines, and the extension directions of another other part of the first compensation lines are the same as that of the data-signal lines, the extension directions of the part of the second compensation lines are the same as that of the gate-signal lines, and the extension directions of the another part of the second compensation lines are the same as that of the data-signal lines.

Optionally. referring to that shown in FIG. 7, FIG. 8 (*a*)-FIG. 8 (b), and FIG. 10 (*a*)-FIG. 17, the second compensation line 52 and the reference line 31 are located between adjacent sub-pixels P. The reference line does not need the loading compensation, so the second compensation line is not electrically connected to the reference line. However, if the second compensation line is not set at a position of the reference line, a problem such as unevenness of overlapping capacitance, etc., may present. Therefore, the application sets the second compensation lines to correspond to the reference lines, such that the displaying uniformity of the display panel may be further improved.

Figure 15:
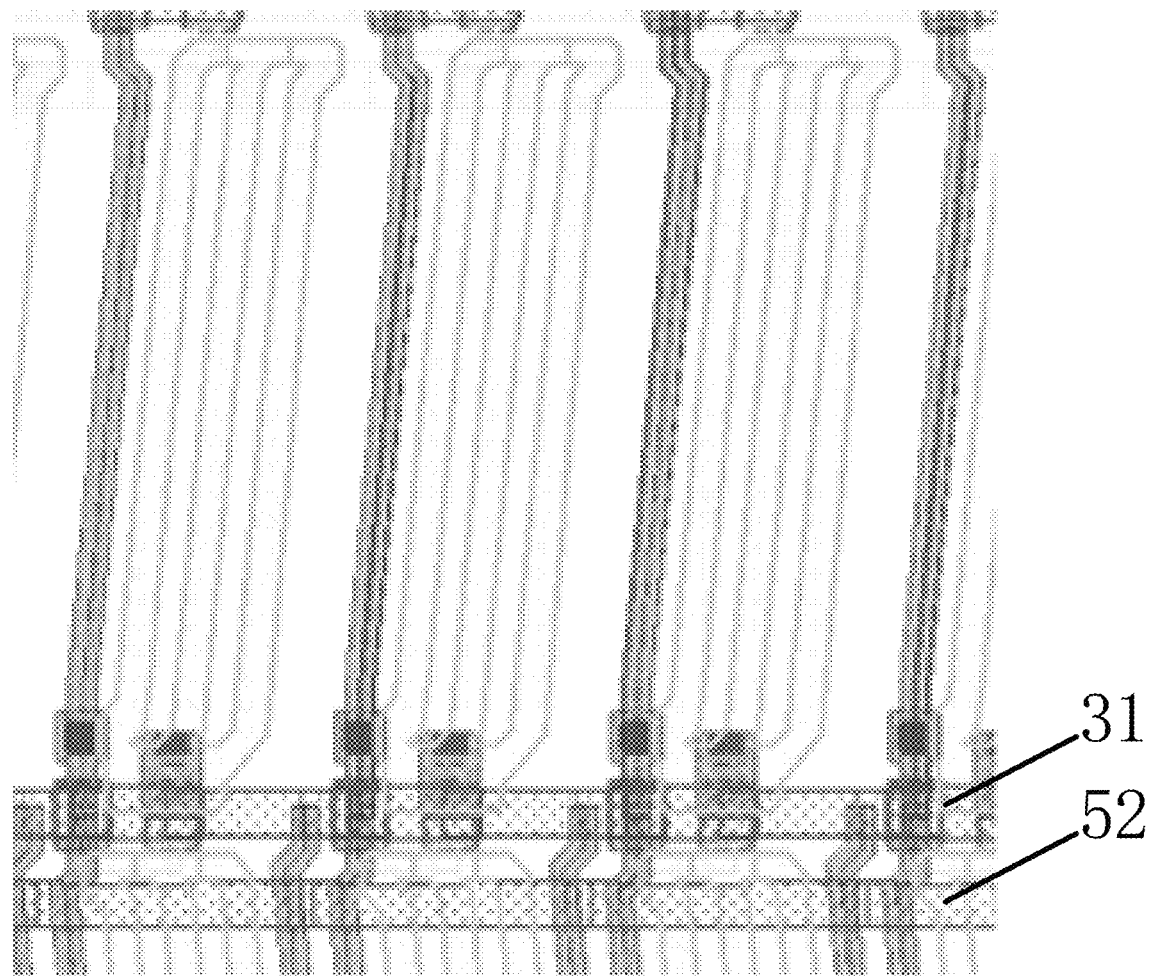
FIG. 15 is a schematic diagram showing a structure of a second compensation line and a reference gate-signal line provided by an embodiment of the application.
Figure 16:
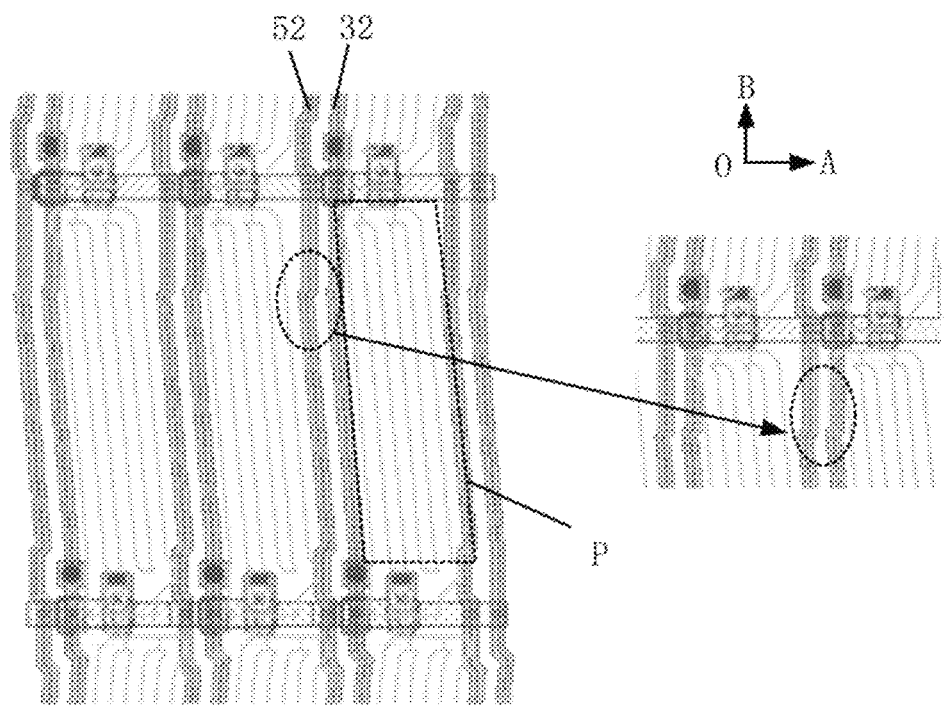
FIG. 16 (*a*) is a schematic diagram showing a structure of a second compensation line and a reference data-signal line provided by an embodiment of the application, and FIG. 16 (*b*) is a schematic diagram showing a disconnection between the second compensation line and the reference data-signal line in the FIG. 16 (*a*).

Specifically, referring to that shown in FIG. 7, FIG. 8 (*a*)-FIG. 8 (*b*) and FIG. 15, the second compensation line 52 and the reference gate-signal line 31 are located between adjacent sub-pixels P. Referring to that shown in FIG. 10 (*a*)-FIG. 10 (*b*) and FIG. 14 (*a*)-FIG. 14 (*b*), the second compensation line 52 and the reference data-signal line 32 are located between adjacent sub-pixels P. It should be noted that, in FIG. 15, a drive gate is indicated by the reference line 31, and a compensation gate is indicated by the second compensation line 52.

Optionally, referring to that shown in FIG. 4, FIG. 5 and FIG. 6, the sizes of the first compensation lines 51 along the extension directions of the first compensation lines are smaller than that of the second compensation lines 52 along the extension directions of the second compensation lines.

The above that the sizes of the first compensation lines along the extension direction of the first compensation line are smaller than that of the second compensation line along the extension direction of the second compensation line, is referred to that: lengths of the first compensation lines along the extension direction of the first compensation line are smaller than that of the second compensation line along the extension direction of the second compensation line. The second compensation line is set to correspond to the reference line, so, by setting the length of the second compensation line along the extension direction of the second compensation line to be longer, the displaying uniformity of the display panel may be further guaranteed.

Optionally, referring to that shown in FIG. 4 and FIG. 5, the compensation lines further include the third compensation lines 53, the third compensation lines 53 are set in the same layer as the first compensation lines 51 and are disconnected from the first compensation lines 51, and the third compensation lines 53 are collinear with the first compensation lines 51.

The third compensation lines are set at positions at which no first compensation line is set, between the adjacent sub-pixels, between which the first compensation lines are set. The third compensation lines are insulated from the lines to be compensated electrically connected with the first compensation lines, and electrically connected with other lines to be compensated. Thus, by setting the first compensation lines and the third compensation lines, and the extension direction of the first compensation lines is the same as that of the third compensation line, such that the compensation lines having the same extension direction may compensate the lines to be compensated along different extension directions, which may not only ensure that the loading compensation is carried out for all of the lines to be compensated, but also ensure the opening rate of the display panel, and save costs.

The above setting in the same layer, is referred to adopting a one-time composition process. The one-time composition process is referred to a process for forming a required layer structure through one time of exposure. The one-time composition process includes processes such as mask, exposure, development, etching, stripping, etc.

A structure of the above third compensation line is not specifically limited here. For example, the third compensation line may be an integral structure; alternatively, the third compensation line may include a plurality of segments. Both FIG. 4 and FIG. 5 are drawn by taking that the third compensation line 53 including the plurality of segments, as an example. At this time, the respective segments are electrically connected with one corresponding line to be compensated.

The above that the third compensation lines and the first compensation lines are set in the same layer and are disconnected from each other, is referred to that: referring to that shown in FIG. 4, a third compensation line 53 and a first compensation line 51 are set as a whole to correspond to a gate-signal line 41 to be compensated; and referring to that shown in FIG. 5, a third compensation line 53 and a first compensation line 51 are set as a whole to correspond to a data-signal line 42 to be compensated.

A specific process for manufacturing the above third compensation line is not limited here. For example, a through hole may be made on a compensation line to form the first compensation line and the second compensation line.

Optionally, referring to that shown in FIG. 4 and FIG. 5, the first compensation line 51 includes a plurality of separate sub-segments, and all of the sub-segments are electrically connected with the lines to be compensated, which is easy to be made and realized.

Referring to that shown in FIG. 4, the lengths of the gate-signal lines 41 to be compensated in an area between a left outer contour of the display panel provided in the application and a left side of the dotted-line box need to be compensated for, and the lengths of the gate-signal lines 41 to be compensated in an area between a right outer contour of the display panel and a right side of the dotted-line box need to be compensated for, therefore, in FIG. 4, the first compensation line 51 is set to include a sub-segment 511 and a sub-segment 512, and a length of the sub-segment 511 is made consistent with a length in the left side that needs to be compensated for, and a length of the sub-segment 512 is made consistent with a length in the right side that needs to be compensated for, which is convenient for production. It is set in FIG. 5 in the same manner as that in FIG. 4, which will not be repeated here.

All of numbers, the lengths, etc., of the above sub-segments are not specifically restricted here. All of numbers, the lengths, etc., of the above sub-segments are determined according to the shape, the area, etc., of the display panel.

Specific manners in which the above sub-line segments are electrically connected with the lines to be compensated are not limited here. For example, the above sub-segments may be directly electrically connected with the lines to be compensated; alternatively, the above sub-segments may be indirectly electrically connected with the lines to be compensated. FIG. 4 is drawn by taking that the sub-segments are electrically connected with the gate-signal lines 41 to be compensated through the first connection lines 61, as an example, and FIG. 5 is drawn by taking that the sub-segments are electrically connected with the data-signal lines 42 to be compensated through the second connection lines 62, as an example.

A process for manufacturing the above sub-segments is not specific restricted here. For example, a plurality of sub-segments may be formed by setting through holes in the first compensation line.

Optionally, referring to that shown in FIG. 4 and FIG. 5, the third compensation lines are spaced by adjacent sub-segments. The third compensation lines are insulated from the lines to be compensated electrically connected with the sub-segments, and electrically connected with other lines to be compensated. Thus, by setting a plurality of sub-segments of the first compensation line and a plurality of sub-segments of the third compensation line, the respective sub-segments may be respectively electrically connected with different lines to be compensated, thus the loading compensation for the respective lines to be compensated may be more accurately controlled.

Referring to that shown in FIG. 4, both the first compensation lines 51 and the third compensation lines 53 are arranged along the extension directions of the gate-signal lines 41 to be compensated, all of the respective sub-segments of the same first compensation line 51 are electrically connected with the same gate-signal line 41 to be compensated, and the third compensation line 53 is electrically connected with one data-signal line 42 to be compensated.

Referring to that shown in FIG. 5, both the first compensation lines 51 and the third compensation lines 53 are arranged along the extension directions of the data-signal lines 42 to be compensated, all of the respective sub-segments of the same first compensation line 51 are electrically connected with the same data-signal line 42 to be compensated, and the third compensation line 53 is electrically connected with one gate-signal line 41 to be compensated.

Optionally. referring to that shown in FIG. 11-FIG. 14 (b), the extension directions of the first compensation lines 51 and the third compensation lines 53 are the same as that of the data-signal lines, and are set in the same layer as the data-signal lines, the first compensation lines 51 are electrically connected with the data-signal lines, and the third compensation lines 53 are electrically connected with the gate-signal lines. Thus, the first compensation lines and the third compensation lines may be set only along the same direction as the extension directions of the data-signal lines, and carry out the loading compensation for the gate-signal lines and data-signal lines at the same time, which may not only improve the displaying uniformity of the display panel, but also ensure the opening rate of the display panel, and save costs.

Specific manners in which the first compensation lines are electrical connected with the data-signal lines are not restricted here. For example, the first compensation lines and the data-signal lines may be directly electrically connected; alternatively, the first compensation lines and the data-signal lines may be indirectly electrically connected. FIG. 11 and FIG. 12 (*a*)-FIG. 12 (*b*) are drawn by taking that the first compensation lines 51 and the data-signal lines 42 to be compensated are connected through the second connection line 62.

Specific manners in which the third compensation lines are electrical connected with the gate-signal lines are not limited here. For example, the third compensation line may be electrically connected with the gate-signal line through a through hole. Referring to that shown in FIG. 18, the gate-signal line and the gate layer 95 are set in the same layer, the third compensation line and the source-drain layer 98 are set in the same layer, the interlayer-dielectric layer 97 and the first insulating layer 96 are provided with through holes, and the third compensation line is electrically connected with the gate-signal line through the through holes in the interlayer-dielectric layer 97 and the first insulating layer 96.

Compensation rules of the compensation lines are not specifically restricted here. For example, loading difference values (including resistance difference values and capacitance difference values) between the respective data-signal lines to be compensated and the reference data-signal line, may be respectively calculated, based on the reference data-signal line, and the difference values are taken as loading compensation values of the respective data-signal lines to be compensated. An electrical connection position of the first compensation line with the data-signal line to be compensated expresses a start of a compensation, and a disconnection end of the first compensation line from the data-signal line to be compensated expresses an end of the compensation. Similarly, the loading difference values between the gate-signal lines to be compensated, whose lengths are smaller than that of the reference data-signal line, and the reference data-signal line are calculated, and the difference values are taken as the loading compensation values of the respective gate-signal lines to be compensated. An electrical connection position of the third compensation line with the gate-signal line to be compensated expresses a start of a compensation, and a disconnection end of the third compensation line from the gate-signal line to be compensated expresses an end of the compensation.

Specifically, based on the reference data-signal line, length difference values d1 between the data-signal lines (the data-signal lines to be compensated), whose lengths are smaller than that of the reference data-signal line, and the reference data-signal line are respectively calculated, the first compensation lines are set at positions of the data-signal lines to be compensated between adjacent sub-pixels, and the first compensation lines are electrically connected with the data-signal lines to be compensated. Referring to that shown in FIG. 11, the first compensation line starts a compensation at an electrical connection position thereof, and the first compensation line is disconnected at an end of the first compensation line that is distant from the electrical connection position by a length d1 calculated from the electrical connection position to the end, referring to that shown in FIG. 11, thus the first compensation line ends the compensation at the disconnection end. That is, the length of the first compensation line starts from a starting position, and when a compensation length is reached, the first compensation line is disconnected, expressing that the compensation is completed. The compensation rules of the reference gate-signal line are similar with that of the reference data-signal line, which will not be repeated here.

Alternatively, referring to that shown in FIG. 7-FIG. 10 (*b*), the extension directions of the first compensation lines 51 and the third compensation lines 53 are the same as that of the gate-signal lines, and are set in the same layer as the gate-signal lines, the first compensation lines 51 are electrically connected with the gate-signal lines, and the third compensation lines 53 may be electrically connected with the data-signal lines. Thus, the first compensation lines and the third compensation lines may be set only along the same direction as the extension directions of the data-signal lines, and carry out the loading compensation for the gate-signal lines and data-signal lines at the same time, which may not only improve the displaying uniformity of the display panel, but also ensure the opening rate of the display panel, and save costs.

Specific manners in which the first compensation lines are electrical connected with the gate-signal lines are not restricted here. For example, the first compensation lines and the gate-signal lines may be directly electrically connected; alternatively, the first compensation lines and the gate-signal lines may be indirectly electrically connected. Both FIG. 7 and FIG. 8 (*a*)-FIG. 8 (*b*) are drawn by taking that the first compensation lines 51 and the gate-signal lines 41 to be compensated are electrically connected through the first connection lines 61, as an example.

Specific manners in which the third compensation lines are electrical connected with the data-signal lines are not limited here. For example, the third compensation line may be electrically connected with the data-signal line through a through hole. Referring to that shown in FIG. 18, the third compensation line is set in the same layer as the gate layer 95, the data-signal line is set in the same layer as the source-drain layer 98, the interlayer-dielectric layer 97 and the first insulating layer 96 are provided with through holes, and the third compensation line is electrically connected with the data-signal line through the through holes in the interlayer-dielectric layer 97 and the first insulating layer 96.

Compensation rules of the compensation lines are not specifically restricted here. For example, loading difference values (including the resistance difference values and the capacitance difference values) between the respective gate-signal lines to be compensated and the reference gate-signal line, may be respectively calculated, based on the reference gate-signal line, and the difference values are taken as loading compensation values of the respective gate-signal lines to be compensated. An electrical connection position of the first compensation line with the gate-signal line to be compensated expresses a start of a compensation, and a disconnection end of the first compensation line from the gate-signal line to be compensated expresses an end of the compensation. Similarly, the loading difference values between the data-signal lines to be compensated, whose lengths are smaller than that of the reference gate-signal line, and the reference gate-signal line are calculated, and the difference values are taken as the loading compensation values of the respective data-signal lines to be compensated. An electrical connection position of the third compensation line with the data-signal line to be compensated expresses a start of a compensation, and a disconnection end of the third compensation line from the data-signal line to be compensated expresses an end of the compensation.

Specifically, based on the reference gate-signal line, length difference values d2 between the gate-signal lines (the gate-signal lines to be compensated), whose lengths are smaller than that of the reference gate-signal line, and the reference gate-signal line are respectively calculated, the first compensation lines are set at positions of the gate-signal lines to be compensated between adjacent sub-pixels, and the first compensation lines are electrically connected with the gate-signal lines to be compensated. Referring to that shown in FIG. 7, the first compensation line starts a compensation at an electrical connection position thereof, and the first compensation line is disconnected at an end of the first compensation line that is distant from the electrical connection position by a length d2 calculated from the electrical connection position to the end, referring to that shown in FIG. 7, thus the first compensation line ends the compensation at the disconnection end. That is, the length of the first compensation line starts from a starting position, and when a compensation length is reached, the first compensation line is disconnected, expressing that the compensation is completed. The compensation rules of the reference data-signal line are similar with that of the reference gate-signal line, which will not be repeated here.

Optionally, in order to simplify the manufacturing processes and save costs, referring to that shown in FIG. 18, the display area further includes the substrate 91, and the gate layer 95 and the source-drain layer 98 that are stacked in sequence on the substrate 91, and the gate layer 95 and the source-drain layer 98 are set to be insulated from each other.

In a condition that the first compensation lines and the third compensation lines are set in the same layer as the data-signal lines, the first compensation lines and the third compensation lines are set in the same layer as the source-drain layer.

Alternatively, in a condition that the first compensation lines and the third compensation lines are set in the same layer as the gate-signal lines, the first compensation lines and the third compensation lines are set in the same layer as the gate layer.

The above that the gate layer 95 and the source-drain layer 98 are set to be insulated from each other, is referred to that: referring to that shown in FIG. 18, the gate layer 95 and the source-drain layer 98 are in different layers, and the first insulating layer 96 and the interlayer-dielectric layer 97 that are stacked in sequence, are included between the gate layer 95 and the source-drain layer 98.

Optionally, referring to that shown in FIG. 4-FIG. 17, the display area further includes the first connecting lines 61 and the second connecting lines 62, and the first connecting lines 61 and the second connecting lines 62 are insulated from each other. The data-signal lines include the data-signal lines 42 to be compensated, and the gate-signal lines includes the gate-signal lines 41 to be compensated.

In a condition that the first compensation lines 51 and the third compensation lines 53 are set in the same layer as the data-signal lines, extension directions of the second connection lines 62 intersect with the extension directions of the data-signal lines, the second connection lines 62 are set in the same layer as the data-signal lines 42 to be compensated, and the first compensation lines 51 are electrically connected with the data-signal lines 42 to be compensated through the second connection lines 62; alternatively, in a condition that the first compensation lines 51 and the third compensation lines 53 are set in the same layer as the gate-signal lines, extension directions of the first connection lines 61 intersect with the extension directions of the gate-signal lines, the first connection lines 61 are set in the same layer as the gate-signal lines 41 to be compensated, and the first compensation lines 51 are electrically connected with the gate-signal lines 41 to be compensated through the first connection lines 61.

The above that the first connecting lines and the second connecting lines are set to be insulated from each other, is referred to that: the first connecting lines and the second connecting lines are set in different layers. For example, the first connecting lines may be set in the same layer as the gate-signal lines, and the second connecting lines may be set in the same layer as the data-signal lines, which subjects to the actual needs.

Numbers of the above first connecting lines and second connecting lines are no specifically limited here. For example, referring to that shown in FIG. 4 and FIG. 5, the number of the first connecting lines 61 is plural; alternatively, referring to that shown in FIG. 6, the number of the first connecting line 61 is one. The number of the first connecting lines is determined according to the number of the first compensation lines. The second connecting lines may be set by referring to the first connecting lines, which will not be repeated here.

In the display panel provided by the embodiments of the present application, through the first connection lines or the second connection lines, it is realized that the compensation lines are electrical connected with the lines to be compensated set in the same layer as the compensation lines, which is simple and easy to be realized.

Optionally, referring to that shown in FIG. 18, the display area further includes the interlayer-dielectric layer 97 located between the gate layer 95 and the source-drain layer 98, and through holes are provided in the interlayer-dielectric layer 97.

In a condition that the first compensation lines and the third compensation lines are set in the same layer as the source-drain layer, the third compensation lines are electrically connected with the gate-signal lines to be compensated through the through holes; alternatively, in a condition that the first compensation lines and the third compensation lines are set in the same layer as the gate layer, the third compensation lines are electrically connected with the data-signal lines to be compensated through the through holes.

In the display panel provided by the embodiments of the application, through the through holes, it is realized that the compensation lines are electrical connected with the lines to be compensated set in a different layer from the compensation lines, which is simple and easy to be realized.

Optionally, referring to that shown in FIG. 6 and FIG. 17, a part of the first compensation lines 51 are electrically connected with the data-signal lines, the extension directions of the part of the first compensation lines 51 are the same as that of the data-signal lines, and the part of the first compensation lines 51 are set in the same layer as the data-signal lines; and another part of the first compensation lines 51 are electrically connected with the gate-signal lines, the extension directions of the another part of the first compensation lines 51 are the same as that of the gate-signal lines, and the another part of the first compensation lines 51 are set in the same layer as the gate-signal lines. Thus, the loading compensation may be carried out for the data-signal lines to be compensated, by the compensation lines, which are set along the same extension direction as the data-signal lines and set in the same layer as the data-signal lines, and the loading compensation may be carried out for the gate-signal lines to be compensated, by the compensation lines, which are set along the same extension direction as the gate-signal lines and set in the same layer as the gate-signal lines, so as to ensure that relatively-complete loading compensation may be carried out for all of the lines to be compensated as much as possible, to improve the displaying uniformity as much as possible.

Optionally, referring to that shown in FIG. 6 and FIG. 17, the display area further includes the first connecting lines 61 and the second connecting lines 62, and the first connecting lines 61 and the second connecting lines 62 are insulated from each other. The data-signal lines include the data-signal lines 42 to be compensated, and the gate-signal lines includes the gate-signal lines 41 to be compensated.

The extension directions of the second connection lines 62 intersect with the extension directions of the data-signal lines, the second connection lines 62 are set in the same layer as the data-signal lines 42 to be compensated, and the first compensation lines 51 are electrically connected with the data-signal lines 42 to be compensated through the second connection lines 62. The extension directions of the first connection lines 61 intersect with the extension directions of the gate-signal lines, the first connection lines 61 are set in the same layer as the gate-signal lines 41 to be compensated, and the first compensation lines 51 are electrically connected with the gate-signal lines 41 to be compensated through the first connection lines 61. Thus, through the first connection lines or the second connection lines at the same time, it is realized that the compensation lines are electrical connected with the lines to be compensated set in the same layer as the compensation lines, which is simple and easy to be realized.

Optionally, referring to that shown in FIG. 18, the display area further includes the substrate 91, and the gate layer 95 and the source-drain layer 98 that are stacked in sequence on the substrate 91, and the gate layer 95 and the source-drain layer 98 are set to be insulated from each other.

A part of the first compensation lines are set in the same layer as the source-drain layer, and another part of the first compensation lines are set in the same layer as the gate layer. Thus, the first compensation lines are divided into two parts set in different layers, and through the first connection lines or the second connection lines, it is realized that the compensation lines in different layers may be respectively electrical connected with the lines to be compensated, which is simple and easy to be realized.

Optionally. referring to that shown in FIG. 18, the display area further includes the interlayer-dielectric layer 97 located between the gate layer 95 and the source-drain layer 98, and the through holes are provided in the interlayer-dielectric layer 97.

The first compensation lines set in the same layer with the source-drain layer are electrically connected with the gate-signal lines to be compensated through the through holes. and the first compensation lines set in the same layer with the gate layer are electrically connected with the data-signal lines to be compensated through the through holes. Thus, by setting the through holes, the first compensation lines are electrically connected with the lines to be compensated in different layers, which is simple and easy to be realized.

An embodiment of the present application further provides a display device, including the above display panel.

The above display device may be a rigid display device (that is, a display screen that may not be bent), for example, it may be an LCD (Liquid Crystal Display) display device, which is not limited here.

The above display device may be any specially-shaped product or component, having a display function, such as a monitor, a display, a TV, a digital camera, a mobile phone, a tablet computer, etc. The above display devices may further be used in the field of automobile, aircraft, etc. Products that have been promoted or have good prospects for promotion, include a vehicle-mounted display, an airborne display, an aircraft display, an advertising display, etc.

The above display device has advantages of good displaying uniformity, narrow border, high screen ratio, good display effect, long service life, high stability, high contrast, good imaging quality, and high product quality, etc.

A large number of specific details are illustrated in the specification provided here. However, it may be understood that the embodiments of the present application may be practiced without these specific details. In some examples, the well-known methods, structures and techniques are not shown in detail, so as not to obscure the understanding for this specification.

Finally, it should be noted that the above embodiments are only used for illustrating the technical solutions of the application, not to limit them. Although the present application has been described in detail with reference to the preceding embodiments, those ordinary skilled in the art should understand that they may still modify the technical solutions recorded in the preceding embodiments or equally substitute a part of the technical features therein. However, these modifications or substitutions do not make the essence of the corresponding technical solutions separate from the spirit and scope of the technical solutions of the embodiments of the application.

The invention claimed is:

1. A display panel having improved displaying uniformity, comprising a display area, wherein the display area comprises:
   a plurality of kinds of signal lines, wherein a same kind of signal lines comprise reference lines and lines to be compensated, sizes of the lines to be compensated along extension directions of the lines to be compensated are smaller than sizes of the reference lines along extension directions of the reference lines; and
   compensation lines, comprising first compensation lines, wherein the first compensation lines are electrically connected with the lines to be compensated, for compensating differences between the sizes of the lines to be compensated along the extension directions of the lines to be compensated and the sizes of the reference lines along the extension directions of the reference lines,
   wherein a number of the compensation lines is less than or equal to a number of the signal lines.

2. The display panel having improved displaying uniformity according to claim 1, wherein the plurality of kinds of signal lines comprise gate-signal lines and data-signal lines, and the gate-signal lines intersect with and are insulated from the data-signal lines,
   in a condition that the number of the compensation lines is less than the number of the signal lines, the number of the compensation lines is equal to a number of the gate-signal lines, or
   the number of the compensation lines is equal to a number of the data-signal lines.

3. The display panel having improved displaying uniformity according to claim 2, further comprising: a plurality of sub-pixels arranged in an array, wherein the gate-signal lines and data-signal lines define an area at which the plurality of sub-pixels are located, and
   the first compensation line, and the line to be compensated electrically connected with the first compensation line, are located between adjacent sub-pixels of the plurality of sub-pixels.

4. The display panel having improved displaying uniformity according to claim 3, wherein the compensation lines further comprise second compensation lines, extension directions of the second compensation lines are the same as that of the first compensation lines, and the second compensation lines are insulated from all of the signal lines, and the second compensation lines are set between adjacent sub-pixels of the plurality of sub-pixels, between which no first compensation line is located.

5. The display panel having improved displaying uniformity according to claim 4, wherein the second compensation line and the reference line are located between the adjacent sub-pixels.

6. The display panel having improved displaying uniformity according to claim 4, wherein sizes of the first compensation lines along the extension directions of the first compensation lines are smaller than sizes of the second compensation lines along the extension directions of the second compensation lines.

7. The display panel having improved displaying uniformity according to claim 4, wherein the compensation lines further comprise third compensation lines, the third compensation lines are set in a same layer as the first compensation lines and are disconnected from the first compensation lines, and the third compensation lines are collinear with the first compensation lines, and the third compensation lines are set at positions at which no first compensation line is set, between adjacent sub-pixels of the plurality of sub-pixels, between which the first compensation lines are set, and the third compensation lines are insulated from the lines to be compensated electrically connected with the first compensation lines, and electrically connected with other lines to be compensated.

8. The display panel having improved displaying uniformity according to claim 7, wherein the first compensation line comprises a plurality of separate sub-segments, and all of the sub-segments are electrically connected with the line to be compensated.

9. The display panel having improved displaying uniformity according to claim 8, wherein the third compensation lines are spaced by adjacent sub-segments of the plurality of separate sub-segments, the third compensation lines are insulated from the lines to be compensated electrically connected with the sub-segments, and electrically connected with other lines to be compensated.

10. The display panel having improved displaying uniformity according to claim 7, wherein extension directions of the first compensation lines and the third compensation lines are the same as that of the data-signal lines, and are set in a same layer as the data-signal lines, the first compensation lines are electrically connected with the data-signal lines, and the third compensation lines are electrically connected with the gate-signal lines, or extension directions of the first compensation lines and the third compensation lines are the same as that of the gate-signal lines, and are set in the same layer as the gate-signal lines, the first compensation lines are electrically connected with the gate-signal lines, and the third compensation lines are electrically connected with the data-signal lines.

11. The display panel having improved displaying uniformity according to claim 10, wherein the display area further comprises a substrate, and a gate layer and a source-drain layer that are stacked in sequence on the substrate, and the gate layer and the source-drain layer are set to be insulated from each other, in a condition that the first compensation lines and the third compensation lines are set in a same layer as the data-signal lines, the first compensation lines and the third compensation lines are set in a same layer as the source-drain layer, or in a condition that the first compensation lines and the third compensation lines are set in a same layer as the gate-signal lines, the first compensation lines and the third compensation lines are set in a same layer as the gate layer.

12. The display panel having improved displaying uniformity according to claim 11, wherein the display area further comprises first connecting lines and second connecting lines, the first connecting lines and the second connecting lines are insulated from each other, the data-signal lines comprise data-signal lines to be compensated, and the gate-signal lines comprises gate-signal lines to be compensated, in the condition that the first compensation lines and the third compensation lines are set in the same layer as the data-signal lines, extension directions of the second connection lines intersect with the extension directions of the data-signal lines, the second connection lines are set in a same layer as the data-signal lines to be compensated, and the first compensation lines are electrically connected with the data-signal lines to be compensated through the second connection lines, or in the condition that the first compensation lines and the third compensation lines are set in the same layer as the gate-signal lines, extension directions of the first connection lines intersect with the extension directions of the gate-signal lines, the first connection lines are set in a same layer as the gate-signal lines to be compensated, and the first compensation lines are electrically connected with the gate-signal lines to be compensated through the first connection lines.

13. The display panel having improved displaying uniformity according to claim 12, wherein the display area further comprises an interlayer-dielectric layer located between the gate layer and the source-drain layer, and through holes are provided in the interlayer-dielectric layer, in a condition that the first compensation lines and the third compensation lines are set in a same layer as the source-drain layer, the third compensation lines are electrically connected with the gate-signal lines to be compensated through the through holes, or in a condition that the first compensation lines and the third compensation lines are set in a same layer as the gate layer, the third compensation lines are electrically connected with the data-signal lines to be compensated through the through holes.

14. The display panel having improved displaying uniformity according to claim 1, wherein the plurality of kinds of signal lines comprise gate-signal lines and data-signal lines, and the gate-signal lines intersect with and are insulated from the data-signal lines, and in a condition that the number of the compensation lines is equal to the number of the signal lines, a number of a part of the compensation lines is equal to a number of the gate-signal lines, and a number of another part of the compensation lines is equal to a number of the data-signal lines.

15. The display panel having improved displaying uniformity according to claim 14, wherein a part of the first compensation lines are electrically connected with the data-signal lines, extension directions of the part of the first compensation lines are the same as that of the data-signal lines, and the part of the first compensation lines are set in a same layer as the data-signal lines; and another part of the first compensation lines are electrically connected with the gate-signal lines, extension directions of the another part of the first compensation lines are the same as that of the gate-signal lines, and the another part of the first compensation lines are set in a same layer as the gate-signal lines.

16. The display panel having improved displaying uniformity according to claim 15, wherein the display area further comprises first connecting lines and second connecting lines, the first connecting lines and the second connecting lines are insulated from each other, the data-signal lines comprise data-signal lines to be compensated, and the gate-signal lines comprises gate-signal lines to be compensated, and extension directions of the second connection lines intersect with the extension directions of the data-signal lines, the second connection lines are set in a same layer as the data-signal lines to be compensated, and the first compensation lines are electrically connected with the data-signal lines to be compensated through the second connection lines; and extension directions of the first connection lines intersect with the extension directions of the gate-signal lines, the first connection lines are set in a same layer as the gate-signal lines to be compensated, and the first compensation lines are electrically connected with the gate-signal lines to be compensated through the first connection lines.

17. The display panel having improved displaying uniformity according to claim 16, wherein the display area further comprises a substrate, and a gate layer and a source-drain layer that are stacked in sequence on the substrate, and the gate layer and the source-drain layer are set to be insulated from each other, and a part of the first compensation lines are set in a same layer as the source-drain layer, and another part of the first compensation lines are set in a same layer as the gate layer.

18. The display panel having improved displaying uniformity according to claim 17, wherein the display area further comprises an interlayer-dielectric layer located between the gate layer and the source-drain layer, and through holes are provided in the interlayer-dielectric layer, and the first compensation lines set in the same layer with the source-drain layer are electrically connected with the gate-signal lines to be compensated through the through holes, and the first compensation lines set in the same layer with the gate layer are electrically connected with the data-signal lines to be compensated through the through holes.

19. The display panel having improved displaying uniformity according to claim 14, further comprising: a plurality of sub-pixels arranged in an array, wherein the gate-signal lines and data-signal lines define an area at which the plurality of sub-pixels are located, and the first compensation line, and the line to be compensated electrically connected with the first compensation line, are located between adjacent sub-pixels of the plurality of sub-pixels.

20. A display device, comprising the display panel having improved displaying uniformity according to claim 1.

* * * * *